United States Patent
Feng et al.

(10) Patent No.: US 12,407,187 B2
(45) Date of Patent: Sep. 2, 2025

(54) PLANAR OMNIDIRECTIONAL WIRELESS POWER TRANSFER SYSTEM

(71) Applicant: VIRGINIA TECH INTELLECTUAL PROPERTIES, INC., Blacksburg, VA (US)

(72) Inventors: Junjie Feng, Blacksburg, VA (US); Qiang Li, Blacksburg, VA (US); Fred C. Lee, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 339 days.

(21) Appl. No.: 17/211,215

(22) Filed: Mar. 24, 2021

(65) Prior Publication Data
US 2022/0311277 A1    Sep. 29, 2022

(51) Int. Cl.
  *H02J 50/00*  (2016.01)
  *H01F 38/14*  (2006.01)
  *H02J 50/12*  (2016.01)
  *H02J 50/40*  (2016.01)

(52) U.S. Cl.
  CPC .............. *H02J 50/12* (2016.02); *H01F 38/14* (2013.01); *H02J 50/402* (2020.01)

(58) Field of Classification Search
  CPC .................................. H02J 50/00; H04B 5/00
  See application file for complete search history.

(56) References Cited

U.S. PATENT DOCUMENTS

| | | | | |
|---|---|---|---|---|
| 10,333,353 | B2 * | 6/2019 | Feng | H02J 7/025 |
| 11,541,247 | B2 * | 1/2023 | Hathaway | A61B 5/062 |
| 2003/0179067 | A1 * | 9/2003 | Gamou | H01F 27/2804 336/223 |
| 2003/0210106 | A1 * | 11/2003 | Cheng | H01F 5/003 333/24 R |
| 2013/0069753 | A1 * | 3/2013 | Kurs | H01F 5/003 336/200 |
| 2014/0152118 | A1 * | 6/2014 | Kim | H01F 27/2847 307/104 |

(Continued)

OTHER PUBLICATIONS

W. Ng, C. Zhang, D. Lin, and S. Hui, "Two- and three dimensional omnidirectional wireless power transfer," IEEE Trans. Power Electron., vol. 29, No. 9, pp. 4470-4474, Jan. 2014.

(Continued)

*Primary Examiner* — Adi Amrany
(74) *Attorney, Agent, or Firm* — Thomas | Horstemeyer, LLP

(57) ABSTRACT

In one example, a planar omnidirectional wireless power transfer system includes high frequency power generator configured to generate a supply of high frequency oscillating power, a number of transmitter-side resonant tank circuits electrically coupled to the high frequency power generator, a planar coil arrangement including a number of coils arranged for omnidirectional power transfer to a device placed over the planar coil arrangement, and a controller configured to activate individual ones of the transmitter-side resonant tank circuits to wirelessly transmit power to the device. In one aspect, the controller can activate individual ones of the transmitter-side resonant tank circuits over time to generate an omnidirectional field distribution for wireless power transmission.

20 Claims, 28 Drawing Sheets

(56) References Cited

U.S. PATENT DOCUMENTS

| | | | | |
|---|---|---|---|---|
| 2015/0162128 | A1* | 6/2015 | Rosenfeld | H01F 38/14 |
| | | | | 336/200 |
| 2015/0222129 | A1* | 8/2015 | McCauley | H01F 27/02 |
| | | | | 307/104 |
| 2017/0222483 | A1* | 8/2017 | Feng | H02J 50/90 |
| 2019/0097448 | A1* | 3/2019 | Partovi | H02J 50/40 |

OTHER PUBLICATIONS

N. Ha-Van and C. Seo, "Analytical and Experimental Investigations of Omnidirectional Wireless Power Transfer Using a Cubic Transmitter," IEEE Transactions on Industrial Electronics, vol. 65, No. 2, pp. 1358-1366, Feb. 2018.

J. Feng, Q. Li, F. C. Lee and M. Fu, "Transmitter Coils Design for Free-Positioning Omnidirectional Wireless Power Transfer System," in IEEE Transactions on Industrial Informatics, vol. 15, No. 8, pp. 4656-4664, Aug. 2019.

B. H. Choi; E. S. Lee.; Y. H. Sohn, G. C. Jang, C. T. Rim, "Six Degrees of Freedom Mobile Inductive Power Transfer by Crossed Dipole Tx and Rx Coils," IEEE Transactions on Power Electronics, vol. 31, No. 4, pp. 3252-3272, Apr. 2016.

A. Sharma, G. Singh, D. Bhatnagar, I. J. Garcia Zuazola and A. Perallos, "Magnetic field forming Using Planar Multicoil Antenna to Generate Orthogonal H-Field Components," in IEEE Transactions on Antennas and Propagation, vol. 65, No. 6, pp. 2906-2915, Jun. 2017.

\* cited by examiner

--Prior Art--

--Prior Art--

PLANAR OMNIDIRECTIONAL WIRELESS POWER TRANSFER SYSTEM

BACKGROUND

Wireless power or energy transfer is directed to the transmission of electrical energy from a power source to an electrical load without the use of conductors. Wireless power transfer can be achieved using a various power transmission technologies using time-varying electric, magnetic, or electromagnetic fields. Wireless power transfer can be particularly useful in situations where the use of conductors is inconvenient or dangerous, for example, to transfer power.

For near-field wireless power transfer, inductive coupling is widely used and its applications include providing power to charge electric toothbrushes, radio-frequency identification (RFID) tags, smartcards, and implantable medical devices. Recently, more emphasis has been placed on the development of wireless power transfer systems for charging mobile and handheld computing devices.

Overall, wireless power transfer with loosely coupled coils is a promising solution to deliver power to a battery in a variety of applications. Due to its convenience, wireless power transfer technology has become popular in electric vehicles, consumer electronics, and medical devices. Thus far, the majority of these systems are directional power transfer systems, and the magnetic field induced by the transmitter coil is in one direction, meaning that the energy power transfer capability degrades greatly when there is some angle misalignment between the coupled coils.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Near-field wireless power transfer can be relied upon to transfer power in various applications or fields of use, such as in military, medical, consumer device, and automotive fields, among others. One challenge in the design of near-field wireless power transfer systems arises because the level of coupling between transmitter and receiver coils can vary. The level or extent of coupling can vary because there is no predefined physical connection or orientation between the transmitter and receiver coils. For example, in a wireless power transfer system where a user is expected to set or place a device upon a charging plate or base, the position and orientation of the receiver coil (with respect to the transmitter coil) is dependent on the user's placement of the device and can vary. Thus, the coupling coefficient between the transmitter and receiver coils is not fixed as in the conventional case where a transformer is used. At the same time, the load presented by the device can vary, for example, based on different charging stages of the charging profile of the battery, among other reasons.

Many conventional wireless power transfer platforms are designed to be directional, meaning that devices are charged efficiently only when placed in a predetermined orientation (or relatively narrow range of certain orientations). Small portable electronic devices can typically be placed near a wireless charging station in a number of different orientations, however, and some of those orientations may not be suitable for efficient wireless power transfer. Thus, a well-designed omnidirectional wireless power transfer system would be desirable for charging portable electronic devices.

Figure 1:
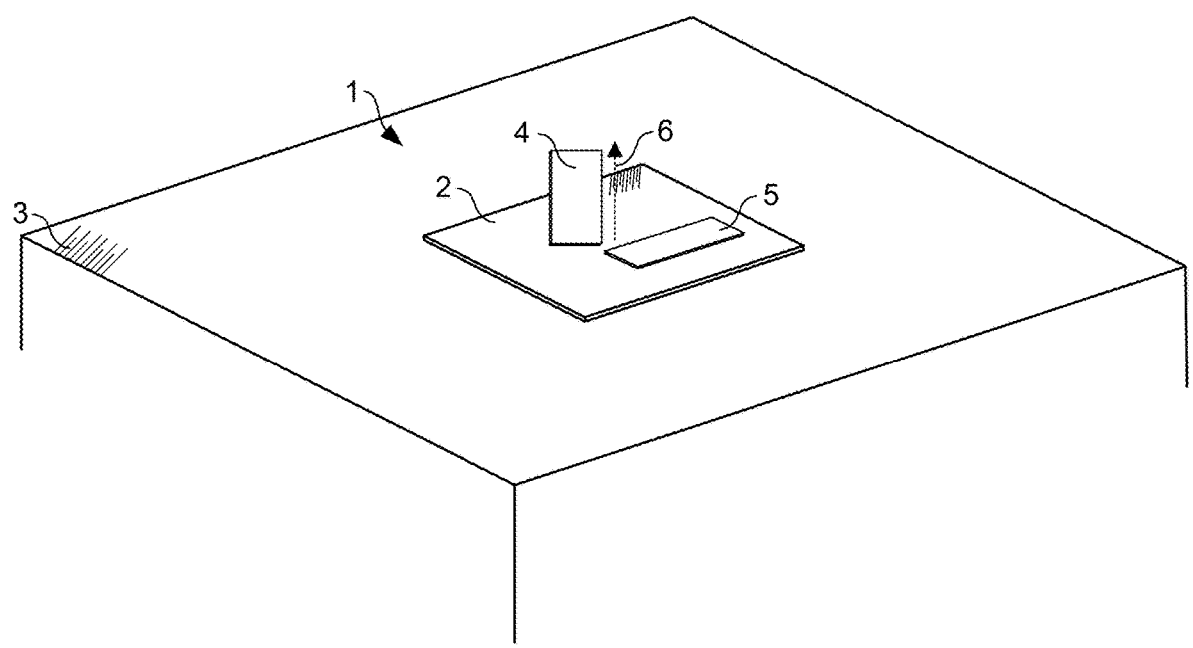
FIG. 1 illustrates an example wireless power transfer system according to various examples described herein.

To illustrate the types of problems that can be encountered with conventional wireless power transfer platforms, FIG. 1 illustrates an example wireless power transfer system 1 according to various examples described herein. The wireless power transfer system 1 includes a wireless charging pad 2 among other components not shown in FIG. 1. The wireless charging pad 2 is set on a planar or relatively planar surface 3. The wireless charging pad 2 includes a coil for wireless power transfer to the devices 4 and 5, among possibly others, placed over the wireless charging pad 2. The devices 4 and 5 can be placed or set on the wireless charging pad 2 in nearly any position and orientation.

The wireless charging pad 2 is designed to generate a magnetic field having primary field density in one (or primarily one) direction 6, such as extending up from a center of the wireless charging pad 2 in a direction orthogonal to the planar surface 3. Based on the respective orientations of the devices 4 and 5, coupling between the magnetic field generated by the wireless charging pad 2 and receiver coils in the devices 4 and 5 will vary. For example, the coefficient of coupling between the magnetic field and the receiver coil in the device 4 may be greater than the coefficient of coupling between the magnetic field and the receiver coil in the device 5. In that case, the wireless charging pad 2 can transfer more power to the device 4 than the device 5. The difference is primarily attributed to the orientation of the devices 4 and 5, and the receiver coils in the devices 4 and 5, over the wireless charging pad 2.

The level or extent of coupling between the wireless charging pad 2 and the devices 4 and 5 can also vary as the devices 4 and 5 are placed and replaced or repositioned on the wireless charging pad 2 over time. The coupling can vary because there is no predefined physical orientation between the wireless charging pad 2 and the receiver coils in the devices 4 and 5. The positions and orientations of the receiver coils in the devices 4 and 5 with respect to the transmitter coil in the wireless charging pad 2 is dependent on a user's placement of the devices 4 and 5 and can vary. Thus, the coupling coefficients are not fixed as in the conventional case where a transformer is used.

Figure 2A:
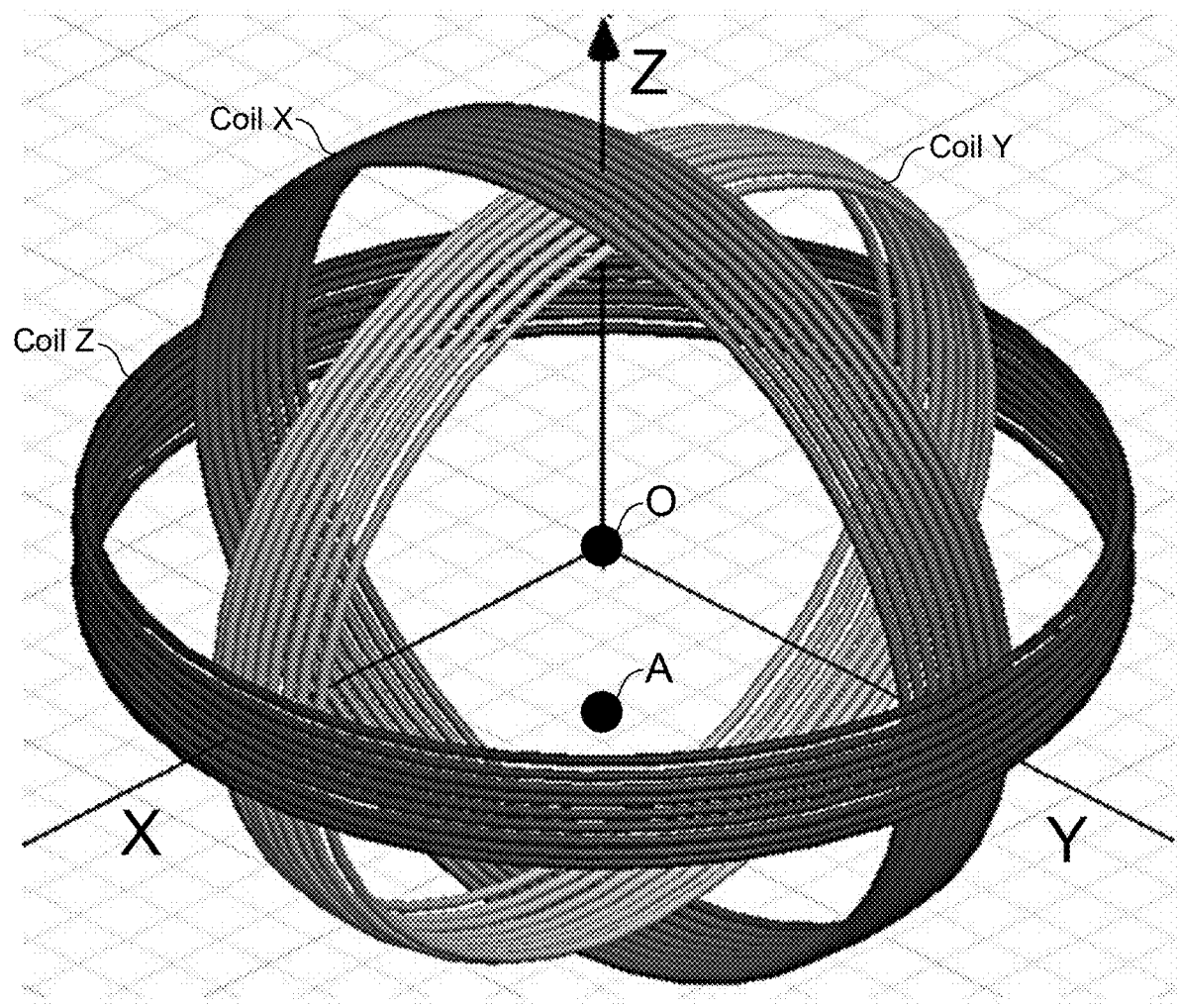
FIG. 2A illustrates an example wireless power transfer platform with three orthogonal, symmetric coils according to various examples described herein.
Figure 2B:
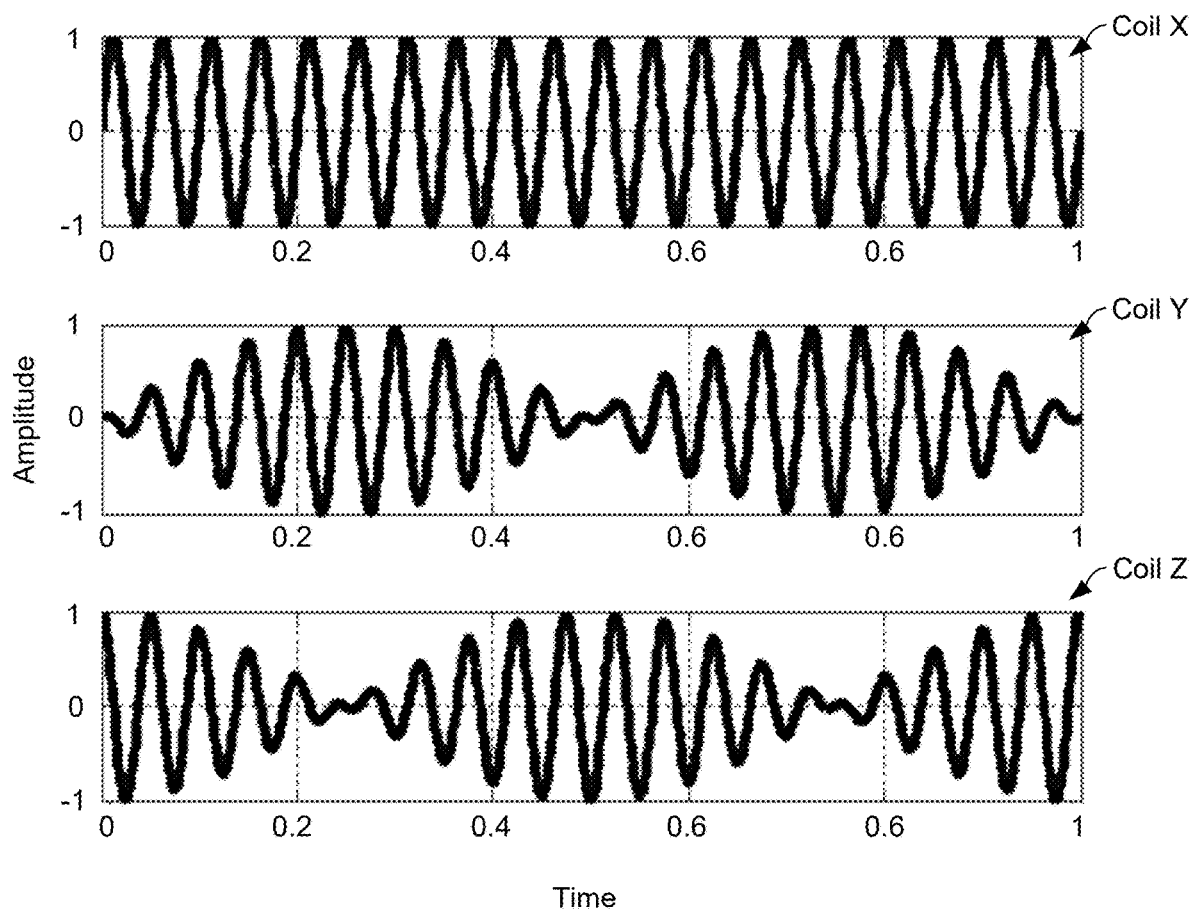
FIG. 2B illustrates example excitation waveforms applied the orthogonal, symmetric coils X, Y, and Z shown in FIG. 2A, respectively, according to various examples described herein.

The wireless power transfer system 1 is designed to generate a magnetic field having primary field density in one direction, but other wireless power transfer systems have been proposed. Example systems are described in U.S. Pat. No. 10,333,353, titled "OMNIDIRECTIONAL WIRELESS POWER TRANSFER SYSTEM," which is hereby incorporated herein by reference in its entirety. An example coil arrangement for wireless power transfer with three orthogonal, symmetric coils X, Y, and Z, is shown in FIG. 2A. The excitation waveforms applied to coils X, Y, and Z, respectively, are shown in FIG. 2B and in expressions (1)-(3) below. The amplitude of the excitation current of coil Y and coil Z is modulated by relatively low frequency sinusoidal waveforms.

$$I_x = I_m \sin(\omega t) \tag{1}$$

$$I_y = I_m \sin(\omega_2 t) \sin\left(\omega t + \frac{\pi}{2}\right) \tag{2}$$

$$I_z = I_m \sin\left(\omega_2 t + \frac{\pi}{2}\right) \sin\left(\omega t + \frac{\pi}{2}\right) \tag{3}$$

With these excitation currents, magnetic field induced at a center of the three symmetric coils can be expressed as:

$$\vec{B}_x = \frac{u_0}{2R} I_x \vec{x}, \vec{B}_y = \frac{u_0}{2R} I_y \vec{y}, \text{ and } \vec{B}_z = \frac{u_0}{2R} I_z \vec{z}, \text{ where} \tag{4}$$

$u_0$ is vacuum permeability, $\vec{x}$, $\vec{y}$, $\vec{z}$ are standard basis vectors, and R is the radius of the coils.

The total magnetic field induced at the center by three coils can be calculated as:

$$\vec{B}_t = \vec{B}_x + \vec{B}_y + \vec{B}_z. \tag{5}$$

The total magnetic field at the center of the three symmetric coils is a time-varying vector, and the magnitude is constant according to expression (6) as:

$$|B_t|^2 = |B_x|^2 + |B_y|^2 + |B_z|^2 = \frac{\mu_o^2 I_m^2}{4R^2} \Big[ \tag{6}$$

$$\sin^2(\omega t) + \sin^2(\omega_2 t) \sin^2\left(\omega t + \frac{\pi}{2}\right) + \sin^2\left(\omega_2 t + \frac{\pi}{2}\right) \sin^2\left(\omega t + \frac{\pi}{2}\right) \Big] = \frac{\mu_o^2 I_m^2}{4R^2}.$$

As such, the field trajectory will be on the surface of a sphere. Thus, with a structure of three symmetric coils and modulated excitation current, omnidirectional field can be induced at the center and magnetic field will rotate in a three-dimensional manner over time.

Other than at the center point O, the magnetic field induced by each coil is not the same and the magnetic field trajectory is not on the surface of a sphere. For example, as for point A in FIG. 2A, which is away from the center, the magnetic field induced by coil X and coil Y is very small and can be neglected compared with the magnetic field induced by coil Z. Therefore, there is no omnidirectional magnetic field at point A. For similar reasons, there is also no omnidirectional magnetic field at any other point other than the center point O. In practice, even with a spherical or semispherical container, devices will fall to the bottom and/or lay on side surfaces of the container, and there is no omnidirectional magnetic field in those areas with the coil structure shown in FIG. 2A.

To improve upon the systems described above with reference to FIGS. 1 and 2A, a number of planar omnidirectional wireless power transfer systems are described herein. According to aspects of the embodiments, an omnidirectional wireless power transfer system includes a high frequency power generator configured to generate a supply of high frequency oscillating power, a number of transmitter-side resonant tank circuits electrically coupled to the high frequency power generator, a planar coil arrangement including a number of coils arranged for omnidirectional power transfer to an electronic device about the planar coil arrangement, and a controller configured to activate individual ones of the transmitter-side resonant tank circuits to wirelessly transmit power to the electronic device through near-field resonant inductive coupling. In one example, the controller can activate individual ones of the transmitter-side resonant tank circuits over time to generate an omnidirectional magnetic field distribution for wireless power transmission. In other aspects, various transmitter-side and receiver-side tank circuits for coupling independent resonance and zero voltage switching (ZVS) operation are described.

Figure 3:
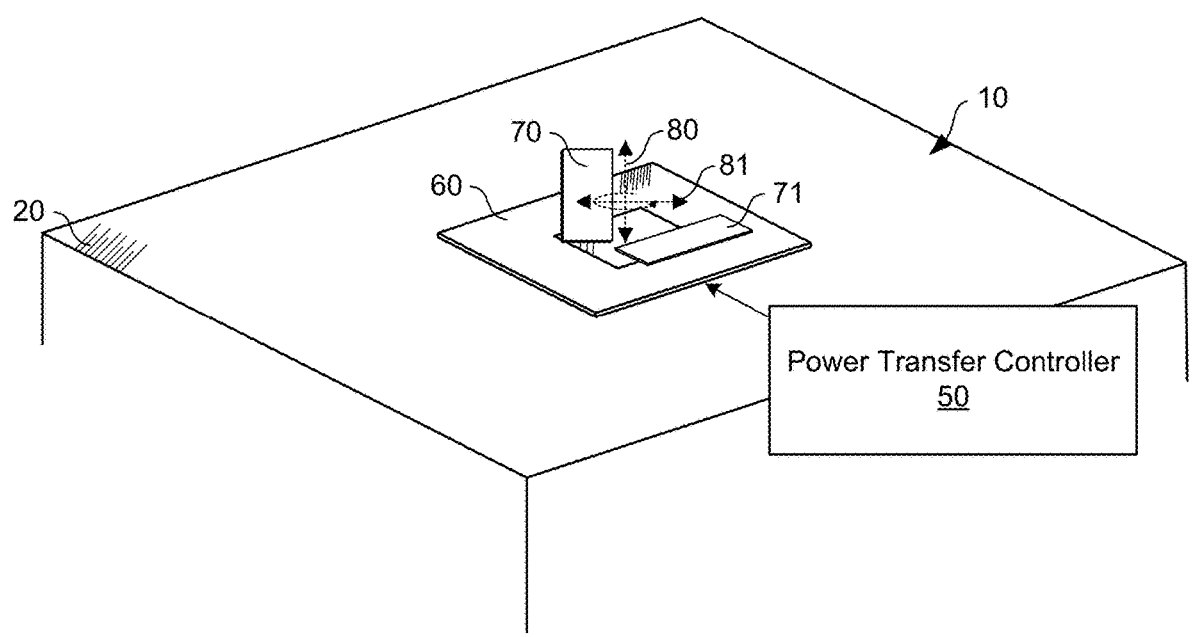
FIG. 3 illustrates an example planar omnidirectional wireless power transfer system according to various aspects of the embodiments described herein.

FIG. 3 illustrates an example planar omnidirectional wireless power transfer system 10 according to various aspects of the embodiments described herein. The wireless power transfer system 10 is a representative example to convey the concepts described herein. The wireless power transfer system 10 can include additional components that are not shown in the drawings, and one or more of the components illustrated can be omitted in some cases.

The wireless power transfer system 10 includes a power transfer controller 50 and a power transfer platform 60. The platform 60 is set on a planar or relatively planar surface 20 in the example shown. The power transfer controller 50 is electrically coupled to and controls the operations of the platform 60. The platform 60 includes a planar coil arrangement. The planar coil arrangement can include a number of coils arranged for omnidirectional wireless power transfer to the devices 70 and 71, among possibly others, placed over the power transfer platform 60.

The platform 60, under the control of the power transfer controller 50, generates fields that extend in more than one direction, including fields that can change direction over time. For example, the power transfer controller 50 can control the platform 60 to generate fields that extend in the vertical direction 80, which is orthogonal to (or substantially orthogonal to) the planar surface 20. The power transfer controller 50 can also control the platform 60 to generate fields that extend in the horizontal direction 81, which is parallel to (or substantially parallel to) the planar surface 20. While having a significant component that runs parallel to the planar surface 20, the horizontal direction 81 can also vary in terms of its rotation. The power transfer controller 50 can also control the platform 60 to vary or shift the direction of generated fields among the vertical direction 80 and the horizontal direction 81 over time. Thus, the wireless power transfer system 10 can generate omnidirectional fields.

The wireless power transfer system 10 can adjust or adapt the extent of inductive coupling between the platform 60 and the devices 70 and 71, even if the devices 70 and 71 are repositioned on the power transfer platform 60 over time. The power transfer controller 50 can adjust or adapt the inductive coupling by powering one or more of the coils in the platform 60 in a certain sequence or manner over time. Thus, the coupling coefficient between the platform 60 and the devices 70 and 71 can be adjusted for the best power transfer, even when the devices 70 and 71 are repositioned over time.

The platform 60 includes a number of coils arranged for omnidirectional power transfer to the devices 70 and 71, among others, through inductive coupling. As described in further detail below with reference to FIGS. 7A and 8A, the coils can be embedded or integrated in or on the platform 60 in a number of different arrangements for the transmission of power. At the same time, the devices 70 and 71 include coils for the receipt of power from the platform 60. Power can be transferred from the power transfer platform 60 to the devices 70 and 71 through inductive coupling. In other aspects of the embodiments, power can be transferred through near-field resonant inductive coupling between magnetically coupled coils that are part of resonant circuits tuned to resonate at a common frequency.

The devices 70 and 71 can include various types of devices, such as cellular phones, watches, gaming devices, fitness trackers, RFID-enabled keys and tags, wireless headphones, tablet computers, e-book readers, and other devices. The positions and orientations of the coils in the platform 60 are known and constant based on design. However, the positions and orientations of the coils in the devices 70 and 71 (i.e., with respect to the platform 60) cannot be known with certainty, because the devices 70 and 71 can be placed in various ways (i.e., positions and orientations) on the platform 60.

In certain aspects of the embodiments, the power transfer controller 50 is configured to activate a number of resonant cell circuits (which include the coils in the platform 60) to provide omnidirectional wireless power transfer to the devices 70 and 71. Due to the omnidirectional nature of the wireless power transfer using the system 10, the transfer of power to the devices 70 and 71 (for charging or other purposes) can be increased as compared to other systems such as those shown in FIGS. 1 and 2A, among others.

Particularly, even though the orientation of the devices 70 and 71 can vary from time to time, the omnidirectional nature of wireless power transfer using the system 10 offers greater power transfer than systems without such omnidirectional characteristics. In the context of the examples described below, the omnidirectional nature of the system 10 is related to the type and arrangement of the coils in the platform 60 and the ability for the power transfer controller 50 to activate those coils, individually or in combination with each other with modulation excitation current. The transfer of power during the activation of individual coils and combinations of coils is evaluated by the power transfer controller 50 to select certain coils which offer better transfer of power. Additionally, the power transfer controller 50 can also modulate the supply of power to individual resonant cell circuits in the system 10, to search for and find a power supply approach for the highest power transfer to the devices 70 and 71.

In other aspects, the system 10 can incorporate resonant converter gain characteristics in which one series resonance frequency is positioned or centered between two parallel resonant frequencies. Resonant converter topologies with such gain characteristics can achieve the advantages of coupling independent resonance and ZVS operation, which means this converter can always operate efficiently no matter how the electronic devices is positioned. Example resonant converter topologies exhibiting those gain characteristics are described in further detail below. These resonant converter topologies are particularly suitable for applications with variable coupling and variable load, such as encountered during wireless power transfer.

Various examples of the coils for use in the platform 60 are described below with reference to FIGS. 4A, 4B, 5A, 5B, 6A, 6B, 7A, 7B, 8A, and 8B. The coils are illustrated in a representative fashion, as examples for the purpose of discussion. The coils are not illustrated as continuous wires or traces, but instead using concentric shapes for ease of illustration. In practice, each of the coils can be formed using a single, non-overlapping (or non-intersecting) conductive wire or trace. The coils can be formed in one or more layers of printed circuit boards (PCBs), as a wire winding secured to a suitable substrate, or using other suitable approaches. The coils in the platform 60 are designed to be planar in nature, such that the platform 60 can be formed in a relatively planar shape or form itself. Thus, the platform 60 can be easily integrated into many different types of structures, such as in desks, tables, and other furniture, in countertops, in automobiles, and in other structures.

Figure 4A:
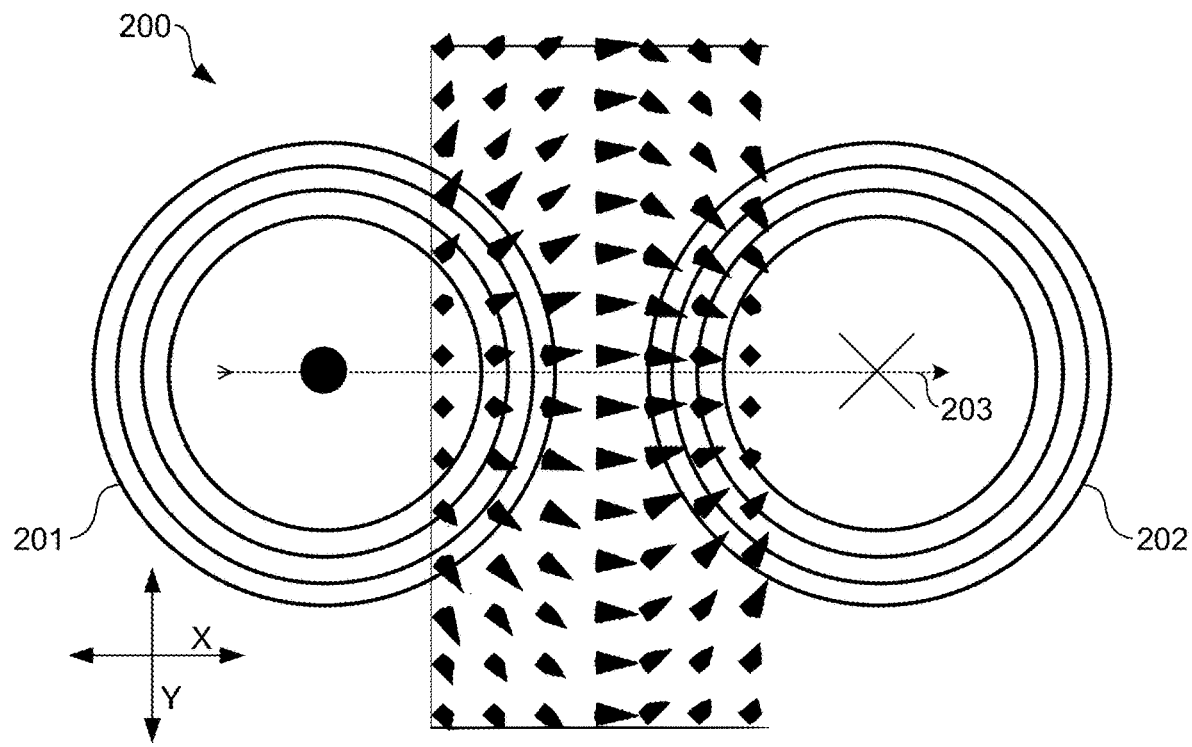
FIG. 4A illustrates a pair of circular coils arranged to provide field directivity between the coils according to various aspects of the embodiments described herein.

FIG. 4A illustrates a pair of circular coils 200 arranged to provide field directivity in a direction 203 (i.e., from left to right on the page, in the X direction) between the coils 200 according to various aspects of the embodiments described herein. The pair of circular coils 200 includes a first circular coil 201 and a second circular coil 202. The first circular coil 201 is arranged in a side-by-side arrangement next to the second circular coil 202. In the example shown, current flows through the first circular coil 201 in a counter-clockwise direction, such that the field generated by the first circular coil 201 extends out of the page. Current flows through the second circular coil 202 in a clockwise direction, such that the field generated by the second circular coil 202 extends into the page.

Because the coils 201 and 202 are arranged next to each other, a portion of the field that extends out of the page through the center of the coil 201 extends toward the coil 202 in the direction 203 and into the page through the center of the coil 201. Thus, over the circular coils 200, a portion of the field extends horizontally in the X direction 203, from left to right across the page. As such, that portion of the field can inductively couple to another coil (not shown), when arranged in a plane that extends orthogonal to the page and also perpendicular to the direction 203 (i.e., in the Y direction).

Figure 4B:
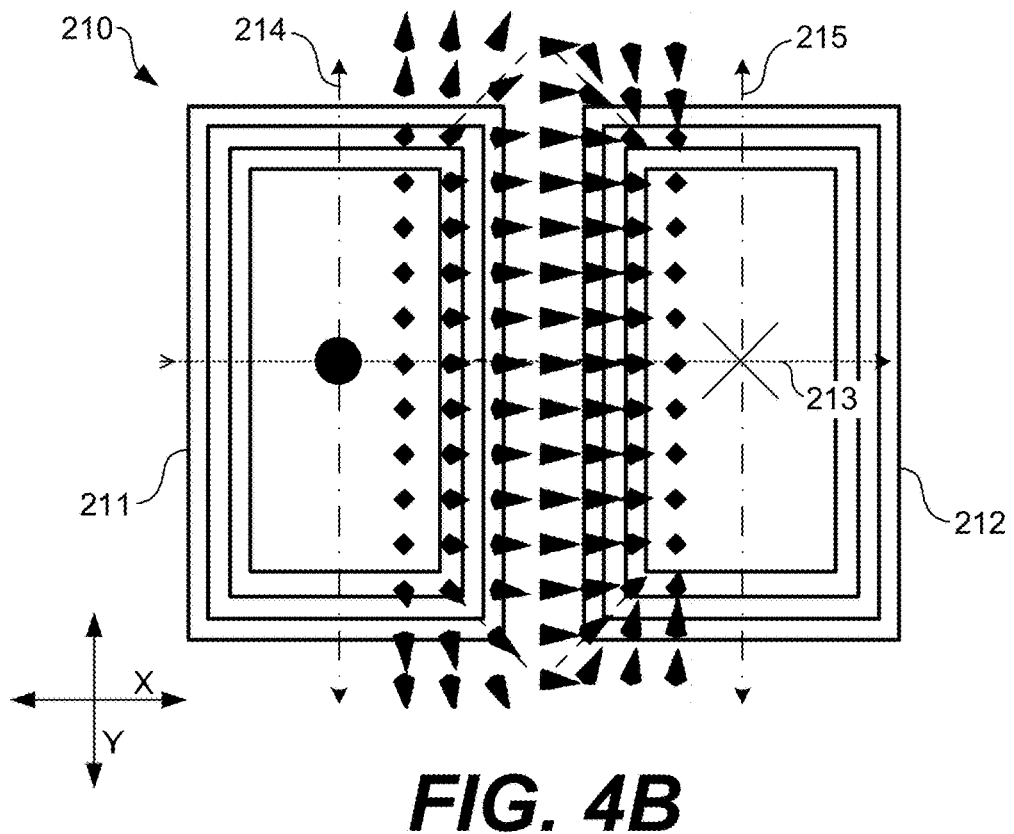
FIG. 4B illustrates a pair of rectangular coils arranged to provide field directivity between the coils according to various aspects of the embodiments described herein.

FIG. 4B illustrates a pair of rectangular coils 210 arranged to provide field directivity in a direction 213 (i.e., from left to right on the page, in the X direction) between the coils 210 according to various aspects of the embodiments described herein. The pair of rectangular coils 210 includes a first rectangular coil 211 and a second rectangular coil 212. The first rectangular coil 211 is arranged in a side-by-side arrangement next to the second rectangular coil 212. The first rectangular coil 211 extends along the longitudinal axis 214, and the second rectangular coil 212 extends along the longitudinal axis 215 as shown. The longitudinal axis 214 extends parallel or substantially parallel to the longitudinal axis 215. In the example shown, current flows through the first rectangular coil 211 in a counter-clockwise direction, such that the field generated by the first rectangular coil 211 extends out of the page. Current flows through the second rectangular coil 212 in a clockwise direction, such that the field generated by the second rectangular coil 212 extends into the page.

Because the coils 211 and 212 are arranged next to each other, a portion of the field that extends out of the page through the center of the coil 211 extends toward the coil 212 in the direction 213 and into the page through the center of the coil 212. Thus, over the rectangular coils 210, a portion of the field extends horizontally in the X direction 213, from left to right across the page. As such, that portion of the field can inductively couple to another coil (not shown), when arranged in a plane that extends orthogonal to the page and also perpendicular to the direction 213 (i.e., in the Y direction). Another example of the horizontal extension of the field in the X direction is shown in FIG. 5A.

Figure 5A:
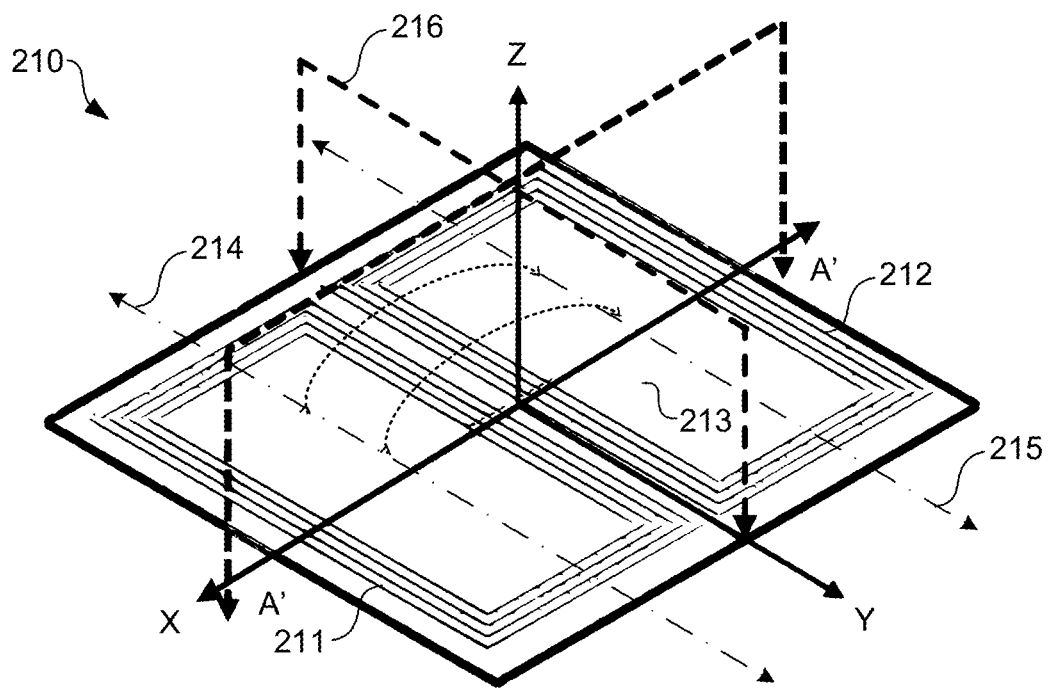
FIG. 5A illustrates a perspective view of the pair of rectangular coils shown in FIG. 4B, arranged to provide field directivity between the coils according to various aspects of the embodiments described herein.

FIG. 5A illustrates a perspective view of the pair of rectangular coils 210 shown in FIG. 4B, arranged to provide field directivity in a direction 213 (i.e., from left to right on the page, in the X direction) between the coils 210 according to various aspects of the embodiments described herein. The pair of rectangular coils 210 includes the first rectangular coil 211 and the second rectangular coil 212. The first rectangular coil 211 is arranged in a side-by-side arrangement next to the second rectangular coil 212. In the example shown, current flows through the first rectangular coil 211 in a counter-clockwise direction. Current flows through the second rectangular coil 212 in a clockwise direction.

Because the coils 211 and 212 are arranged next to each other, a portion of the field that extends out of the page through the center of the coil 211 extends toward the coil 212 in the direction 213 and into the page through the center of the coil 212. Thus, over the rectangular coils 210, a portion of the field extends horizontally in the X direction 213, from left to right across the page, as shown. As such, that portion of the field can inductively couple to another coil (not shown), when arranged in the plane 216 that extends orthogonal to the page and also perpendicular to the direction 213 (i.e., in the Y direction).

Figure 5B:
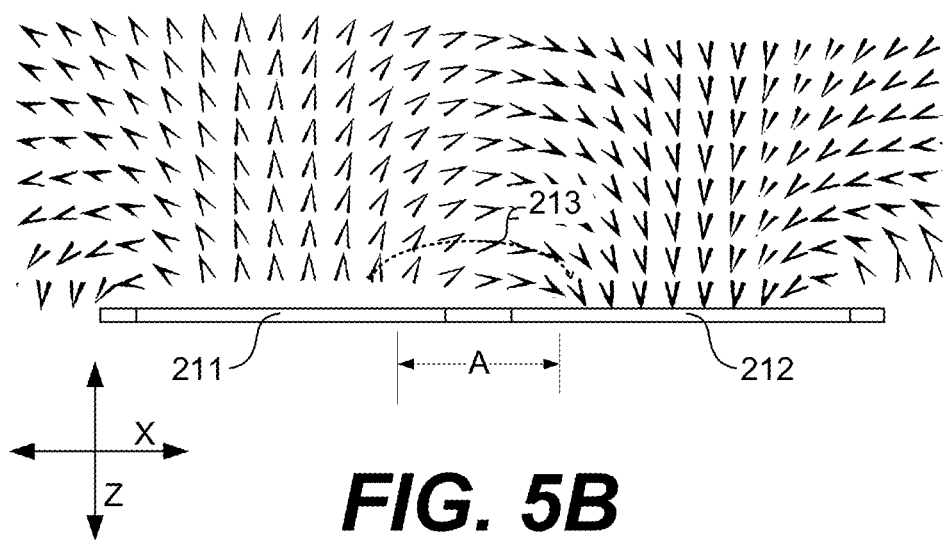
FIG. 5B is an example cross-sectional diagram of fields generated by the pair of rectangular coils shown in FIG. 5A, taken along A'-A' in FIG. 5A, according to various aspects of the embodiments described herein.

FIG. 5B is an example cross-sectional diagram of fields generated by the pair of rectangular coils 210 shown in FIG. 5A, taken along A'-A' in FIG. 5A, according to various aspects of the embodiments described herein. The coils 211 and 212 are shown in the side-by-side arrangement in FIG. 5B, with the portion of the field extending in horizontally in the X direction 213. An example length "A" of the extension in the horizontal direction 213 is shown in FIG. 5B.

Figure 6A:
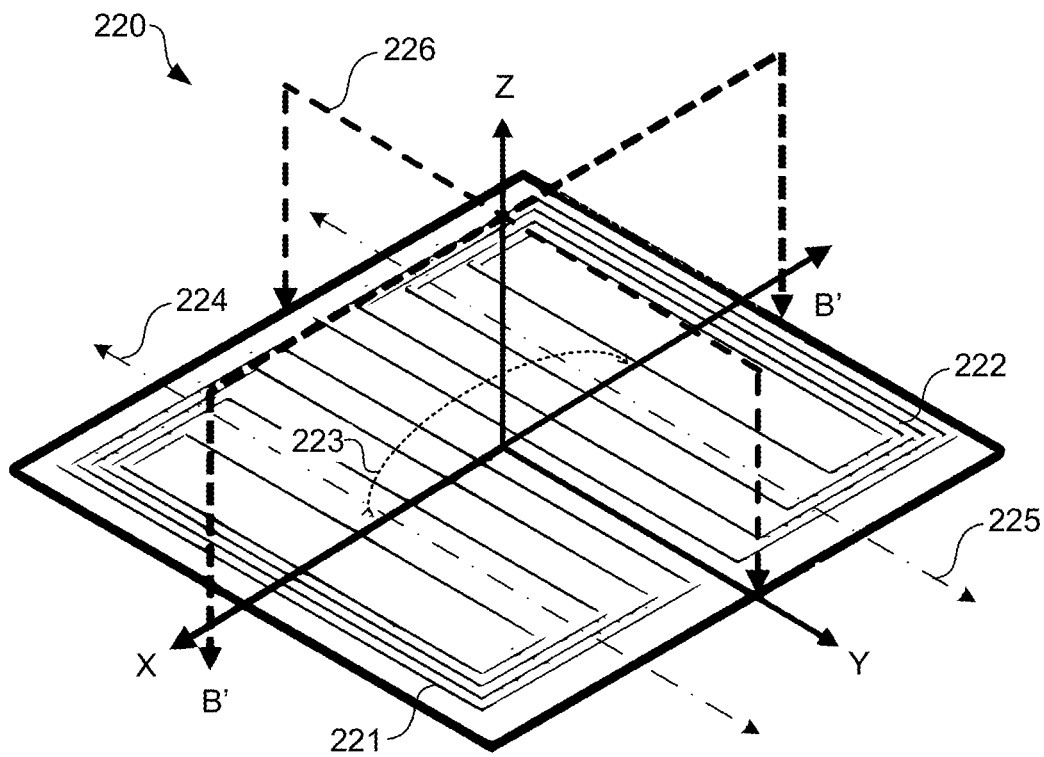
FIG. 6A illustrates a perspective view of a pair of graduated rectangular coils, arranged to provide field directivity between the coils according to various aspects of the embodiments described herein.

FIG. 6A illustrates a perspective view of a pair of graduated rectangular coils 220, arranged to provide field directivity in a direction 223 (i.e., from left to right on the page, in the X direction) between the coils 220 according to various aspects of the embodiments described herein. The pair of graduated rectangular coils 220 includes the first graduated rectangular coil 221 and the second graduated rectangular coil 222. The first graduated rectangular coil 221 is arranged in a side-by-side arrangement next to the second graduated rectangular coil 222. The first graduated rectangular coil 221 extends along the longitudinal axis 224, and the second graduated rectangular coil 222 extends along the longitudinal axis 225 as shown. The longitudinal axis 224 extends parallel or substantially parallel to the longitudinal axis 225. In the example shown, current flows through the first graduated rectangular coil 221 in a counter-clockwise direction. Current flows through the second graduated rectangular coil 222 in a clockwise direction.

Because the coils 221 and 222 are arranged next to each other, a portion of the field that extends out of the page through the center of the coil 221 extends toward the coil 222 in the direction 223 and into the page through the center of the coil 222. Thus, over the rectangular coils 220, a portion of the field extends horizontally in the X direction 223, from left to right across the page, as shown. As such, that portion of the field can inductively couple to another coil (not shown), when arranged in the plane 226 that extends orthogonal to the page and also perpendicular to the direction 223 (i.e., in the Y direction).

Figure 6B:
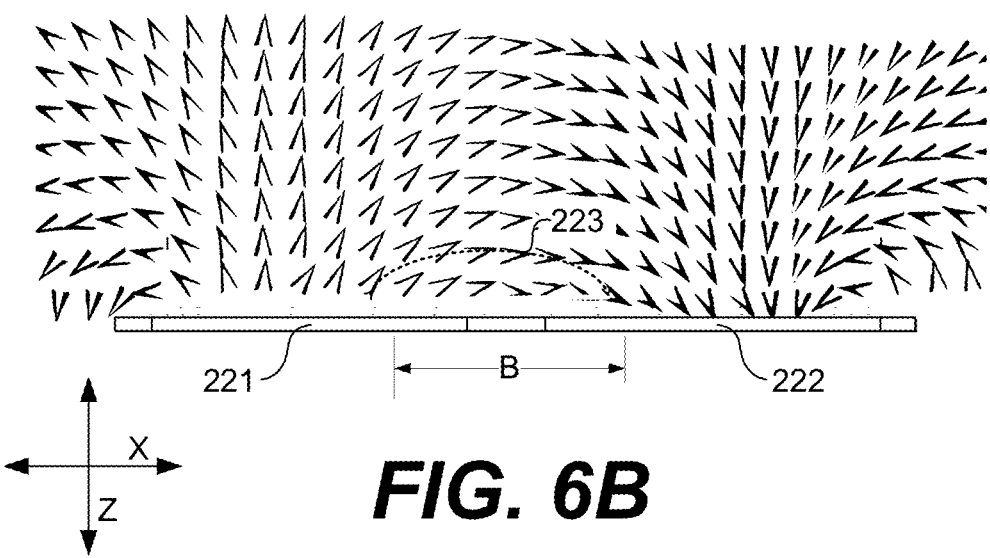
FIG. 6B is an example cross-sectional diagram of fields generated by the pair of rectangular coils shown in FIG. 6A, taken along B'-B' in FIG. 6A, according to various aspects of the embodiments described herein.

FIG. 6B is an example cross-sectional diagram of fields generated by the pair of rectangular coils 220 shown in FIG. 6A, taken along B'-B' in FIG. 6A, according to various aspects of the embodiments described herein. The coils 221 and 222 are shown in the side-by-side arrangement in FIG. 6B, with the portion of the field extending in horizontally in the X direction 223. An example length "B" of the extension in the horizontal direction 223 is shown in FIG. 6B. The length "B" in FIG. 6B is longer than the length "A" in FIG. 5B, because the rectangular coils 221 and 222 in FIG. 6A are graduated, as compared to the rectangular coils 211 and 212 in FIG. 5A. Thus, the graduated rectangular coils 221 and 222 can provide a larger area for inductive coupling over the horizontal direction 223 than the rectangular coils 211 and 212. The magnetic field induced by the graduated rectangular coils 221 is also more uniform as compared with the rectangular coils 211 and 212. Additional aspects of the graduated rectangular coils 221 and 222 are described in further detail below with reference to FIG. 7.

Figure 7A:
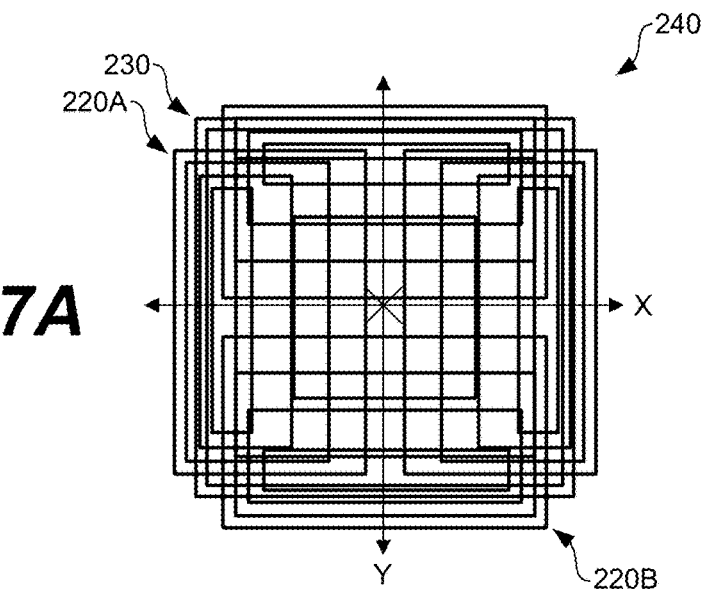
FIG. 7A illustrates an example planar coil arrangement including a first pair of graduated coils, a second pair of graduated coils, and a third coil according to various aspects of the embodiments described herein.
Figure 7B:
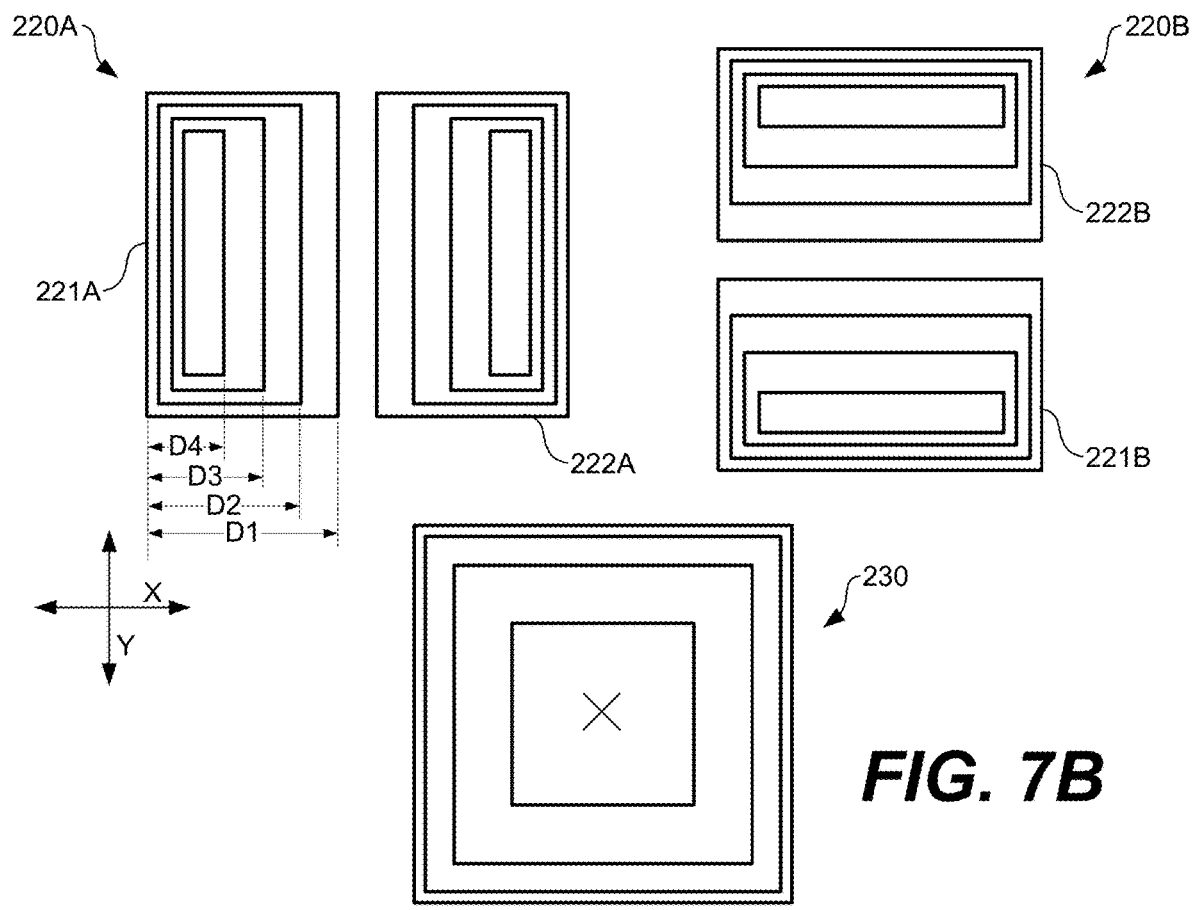
FIG. 7B illustrates the first pair of graduated coils, the second pair of graduated coils, and the third coil shown in FIG. 7A according to various aspects of the embodiments described herein.

FIG. 7A illustrates an example planar coil arrangement 240 according to various aspects of the embodiments described herein. The platform 60 can incorporate or include the planar coil arrangement 240. The planar coil arrangement 240 includes a first pair of graduated coils 220A to provide field directivity in a first "X" direction, a second pair of graduated coils 220B to provide field directivity in a second "Y" direction, and a third coil 230 to provide field directivity in a third "Z" (i.e., out of the page) direction. The coils 220A, 220B, and 230 are centered and can overlap each other in some lengths of windings, although the coils 220A, 220B, and 230 are electrically isolated or separated from each other. FIG. 7B illustrates the first pair of graduated coils 220A, the second pair of graduated coils 220B, and the third coil 230 shown in FIG. 7A, separated from each other.

The planar coil arrangement 240 and the coils 220A, 220B, and 230 are illustrated in a representative fashion in FIGS. 7A and 7B, as examples for the purpose of discussion. The coils 220A, 220B, and 230 are not illustrated as continuous wires or traces, but instead using concentric shapes for ease of illustration. In practice, each of the coils 220A, 220B, and 230 can be formed using one or more conductive wires or traces. The coils 220A, 220B, and 230 can be formed in one or more layers of PCBs, as windings secured to a suitable substrate, or using other suitable approaches. The coils 220A, 220B, and 230 are designed to be planar in nature, such that the planar coil arrangement 240 can be formed in a relatively planar shape or form itself. Thus, the planar coil arrangement 240 can be easily integrated into many different types of structures, such as in desks, tables, and other furniture, in countertops, in automobiles, and in other structures. Currents can be supplied, respectively, to the coils 220A, 220B, and 230 of the planar coil arrangement 240 by the power transfer controller 50 (FIG. 3), to provide omnidirectional wireless power transfer, as described in further detail below with reference to FIG. 9.

Referring to FIG. 7B, the first pair of graduated rectangular coils 220A includes a first graduated rectangular coil 221A and the second graduated rectangular coil 222A. The second pair of graduated rectangular coils 220B includes a first graduated rectangular coil 221B and the second graduated rectangular coil 222B. A longitudinal axis of the coils 221A and 222A extend in the "X" direction, and the longitudinal axis of the coils 221B and 222B extend in the "Y" direction, as shown. Thus, the coils 221A and 222A have a longitudinal axis that extends perpendicular to the longitudinal axis of the coils 221B and 222B.

The first graduated rectangular coil 221A includes a number of windings. In the example shown, the windings are graduated in length along the "X" direction, with the outer winding extending a distance "D1," the next inner winding extending the distance "D2," the next inner winding extending the distance "D3," and the next inner winding extending the distance "D4." The distance "D1," is larger than the distance "D2," the distance "D2" is larger than the distance "D3," and the distance "D3" is larger than the distance "D4." The second graduated rectangular coil 222A includes a similar arrangement of graduated-length windings. The second pair of graduated rectangular coils 220B is similar to the first pair of graduated rectangular coils 220A. Thus, the first pair of graduated rectangular coils 220A can provide a relatively large area for inductive coupling over the direction "X," and the second pair of graduated rectangular coils 220B can provide a relatively large area for inductive coupling over the direction "Y."

The third coil 230 includes a number of concentric, graduated windings, as shown in FIG. 7B. The third coil 230 includes only one coil, rather than a pair of coils, as with the coils 220A and 220B. The third coil 230 is also square in shape in the example shown in FIG. 7B, rather than the rectangular shape of the coils 220A and 220B. The third coil 230 can thus be relied upon to provide field directivity in a third "Z" (i.e., out of the page) direction.

In various embodiments, the coils 220A, 220B, and 230 can include any suitable number of concentric, graduated windings or turns of windings. Although each of the coils 220A, 220B, and 230 is shown to include four winding turns, any suitable number of turns can be relied upon. Additionally, the overall dimensions of the coils 220A, 220B, and 230 can vary as compared to that shown. The coils 220A, 220B, and 230 can be larger or smaller than those shown in FIGS. 7A and 7B.

PCB fabrication technology can be relied upon to implement the planar coil arrangement 240, among others described herein, in a low-cost manner. The coils 220A (for "X" field directivity), 220B (for "Y" field directivity), and 230 (for "Z" field directivity) can be printed in different layers of the PCB. For an example four-layer PCB implementation, the coils 220A can be implemented in layer 1, the coil 230 can be implemented in layer 2, interconnects can be implemented in layer 3, and the coils 220B can be implemented in layer 4. The distance between layer 1 and layer 2 can be only 0.3 mm, although larger or smaller dimensions can be relied upon.

The small integration can increase the parasitic capacitance between the coils 220A, 220B, and 230. There are two main types parasitic capacitance, including inter-coil capacitance between two different coils and equivalent parallel capacitance (EPC) of single coil. In one example, the EPC of the coil 230 is about 72 pF. Since the self-inductance of the coil 230 is about 3 uH, the self-resonance frequency of coil 230 is about 10.8 MHz. To follow the AirFuel™ wireless charging standard, the operating frequency of the power transfer system 10 can be selected as 6.78 MHz. Therefore, the EPC is so large that the self-resonance will happen near the operating frequency, which means large electric field and extra dielectric loss. In addition, the large inter-coil capacitance leads to unnecessary circulation energy flowing among different transmitter coils and the circulating energy also results in extra loss. Considering this, it can be helpful to reduce the parasitic capacitances between the coils 220A, 220B, and 230.

Figure 8A:
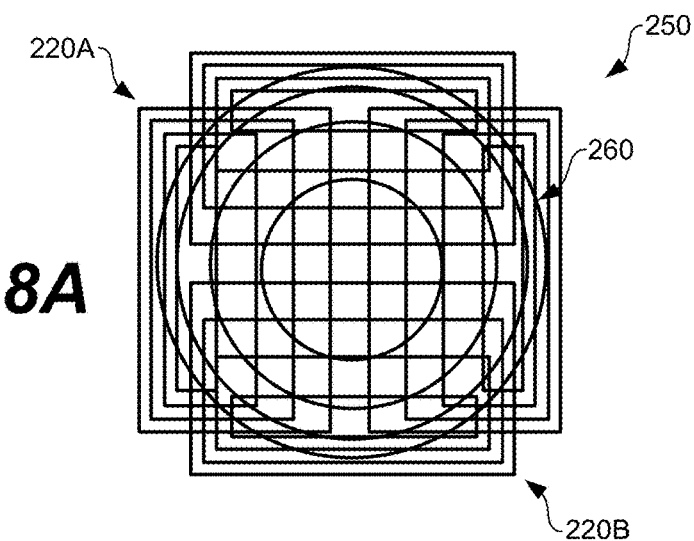
FIG. 8A illustrates another example planar coil arrangement including a first pair of graduated coils, a second pair of graduated coils, and a third coil according to various aspects of the embodiments described herein.
Figure 8B:
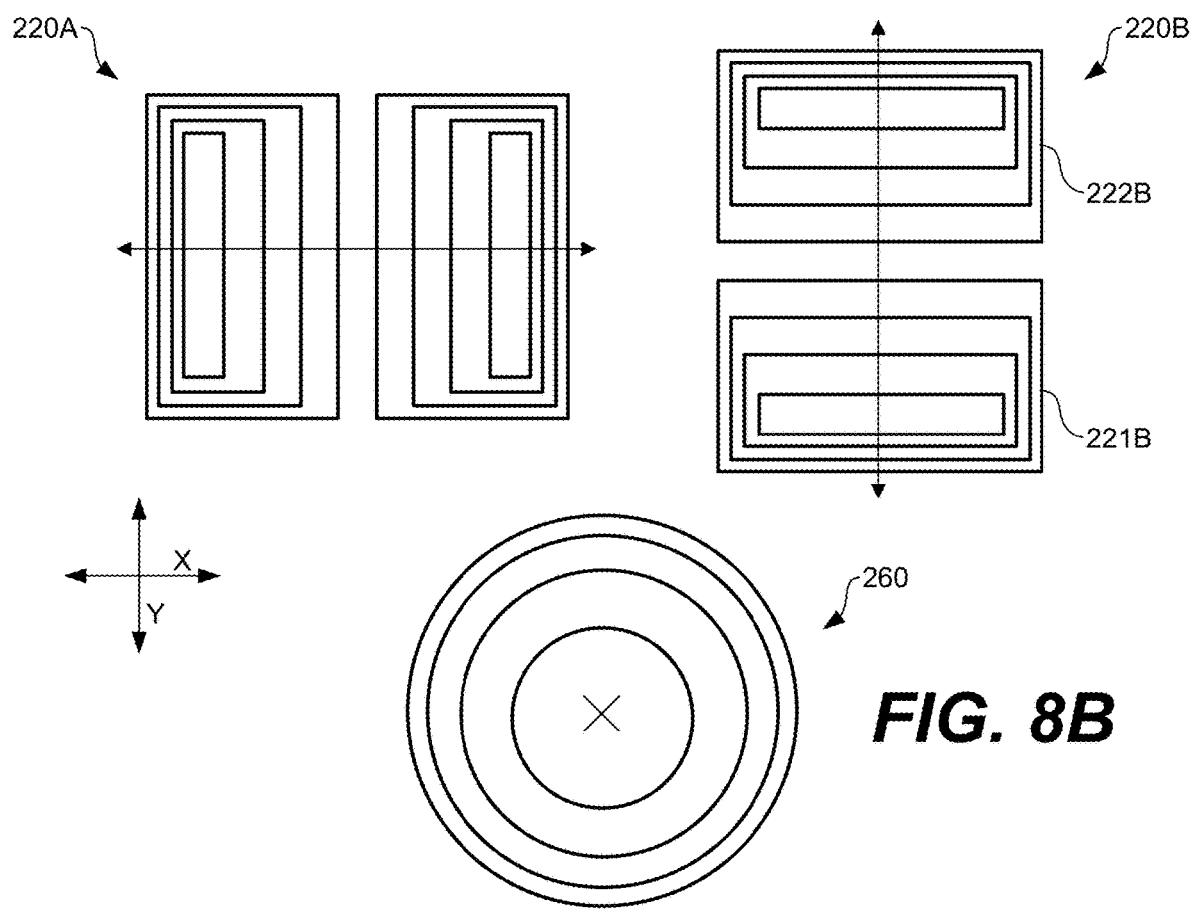
FIG. 8B illustrates the first pair of graduated coils, the second pair of graduated coils, and the third coil shown in FIG. 7B according to various aspects of the embodiments described herein.

FIG. 8A illustrates an example planar coil arrangement 250 according to various aspects of the embodiments described herein. The platform 60 can incorporate or include the planar coil arrangement 250. The planar coil arrangement 240 includes the first pair of graduated coils 220A to provide field directivity in a first "X" direction, the second pair of graduated coils 220B to provide field directivity in a second "Y" direction, and a third coil 260 to provide field directivity in a third "Z" (i.e., out of the page) direction. The coils 220A, 220B, and 260 are centered and can overlap each other in some lengths of windings, although the coils 220A, 220B, and 260 are electrically isolated or separated from each other. FIG. 8B illustrates the first pair of graduated coils 220A, the second pair of graduated coils 220B, and the third coil 260 shown in FIG. 8A, separated from each other.

The planar coil arrangement 250 and the coils 220A, 220B, and 260 are illustrated in a representative fashion in FIGS. 8A and 8B, as examples for the purpose of discussion. The coils 220A, 220B, and 260 are not illustrated as continuous wires or traces, but instead using concentric shapes for ease of illustration. In practice, each of the coils 220A, 220B, and 260 can be formed using one or more conductive wires or traces. The coils 220A, 220B, and 260 can be formed in one or more layers of PCBs, as windings secured to a suitable substrate, or using other suitable approaches. The coils 220A, 220B, and 260 are designed to be planar in nature, such that the planar coil arrangement 250 can be formed in a relatively planar shape or form itself. Thus, the planar coil arrangement 250 can be easily integrated into many different types of structures, such as in desks, tables, and other furniture, in countertops, in automobiles, and in other structures. Currents can be supplied, respectively, to the coils 220A, 220B, and 260 of the planar coil arrangement 250 by the power transmission controller 50 (FIG. 3), to provide omnidirectional wireless power transfer, as described in further detail below with reference to FIG. 9.

The coil 260 includes a number of concentric, graduated windings, as shown in FIG. 8B. The coil 260 includes only one coil, rather than a pair of coils, as with the coils 220A and 220B. The third coil 230 is also round in shape in the example shown in FIG. 8B, rather than the rectangular shape of the coils 220A and 220B. The coil 260 can thus be relied upon to provide field directivity in a third "Z" (i.e., out of the page) direction.

The coil 260 in FIG. 8B can provide certain advantages for some applications as compared to the coil 230 shown in FIG. 7B. When arranged in the planar coil arrangement 250 with the coils 220A and 220B, the coil 260 does not include as many lengths of windings that extend parallel to lengths of windings of the coils 220A and 220B. Thus, the coil 260 is designed to reduce parasitic capacitance among the windings in the planar coil arrangement 250 shown in FIG. 8A as compared to the planar coil arrangement 240 shown in FIG. 7A. The circular shape of the coil 260 reduces the overlap or parallel extension with the coils 220A and 220B. Based on the circular design of the coil 260, the parasitic capacitances between the coil 260 and the coils 220A and 220B can be reduced by more than 50% in some cases as compared to the parasitic capacitances between the coil 230 and the coils 220A and 220B. The self-resonance frequency of the coil 260 can thus be modified, for example, to 20 MHz with the modified design, which is further away from the example operating frequency 6.78 MHz. In other design aspects, the spacings (e.g., laminate layer thickness) between different layers in the PCB board supporting the coils 220A, 220B, and 260 can also be increased, and the widths of each winding turn can be decreased to further reduce parasitic capacitances if necessary.

The planar coil arrangements 240 and 250 shown in FIGS. 7A and 8A facilitate the generation of magnetic fields in different directions over time. The power transfer controller 50 can activate one or more of the coils 220A, 220B, 230, and 260 in the planar coil arrangements 240 and 250, over time in various ways, to generate a composite magnetic field having a certain direction and magnitude. The direction and magnitude of the magnetic field will depend, at least in part, upon which of the coils 220A, 220B, 230, and 260 are excited, and the magnitude and phase of the exciting current (s) provided to the coils 220A, 220B, 230, and 260, respectively, as determined by the power transfer controller 50. Thus, the power transfer controller 50 can activate or excite one or more of the coils 220A, 220B, 230, and 260 at a particular, potentially modulated, magnitude and/or phase, depending upon where the devices 70 and 71, among others, are positioned over the power transfer platform 60 (FIG. 3). The generation of magnetic field at a particular, adjustable direction and magnitude is advantageous because the orientation of the coils in the electronic devices 30-33 can vary depending upon how the electronic devices 30-33 settle into the receptacle 20 as described above.

Figure 8C:
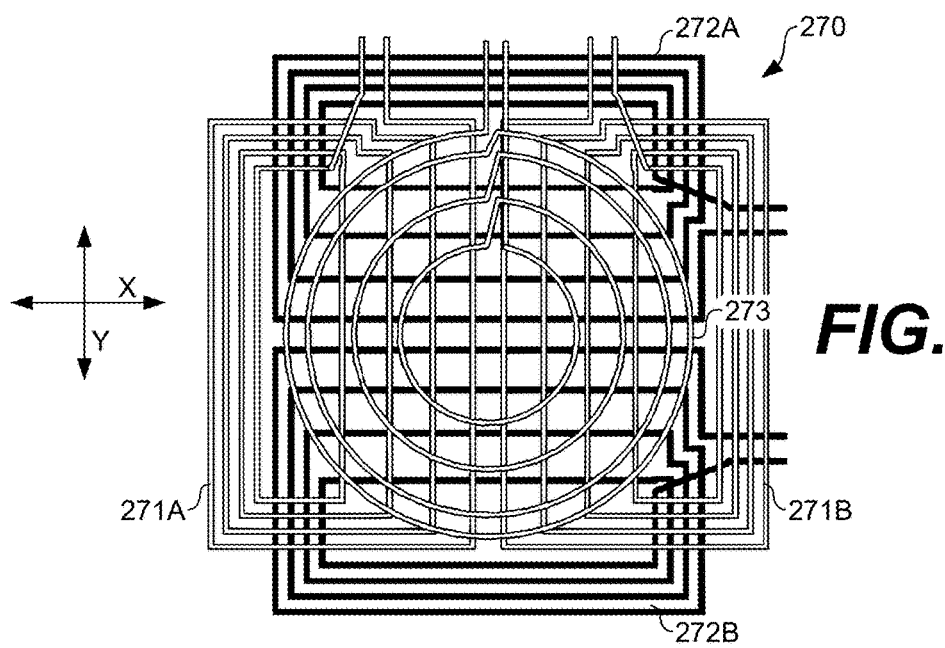
FIG. 8C illustrates the practical application of the planar coil arrangement shown in FIG. 8A according to various aspects of the embodiments described herein.

FIG. 8C illustrates the practical application of the planar coil arrangement shown in FIG. 8A, identified as the planar coil arrangement 270. The platform 60 can incorporate or include the planar coil arrangement 270. The planar coil arrangement 270 includes a first pair of graduated coils 271A, 271B to provide field directivity in a first "X" direction, a second pair of graduated coils 272A, 272B to provide field directivity in a second "Y" direction, and a third coil 273 to provide field directivity in a third "Z" (i.e., out of the page) direction. The coils 271A, 271B, 272A, 272B, and 273 are centered and can overlap each other in some lengths of windings, although the coils are electrically isolated or separated from each other. As compared to the planar coil arrangement 250 shown in FIG. 8A (which is representative), the planar coil arrangement 270 shows an example of how a single, continuous winding or trace can be used to form graduated coils.

Figures 8D, 8E:
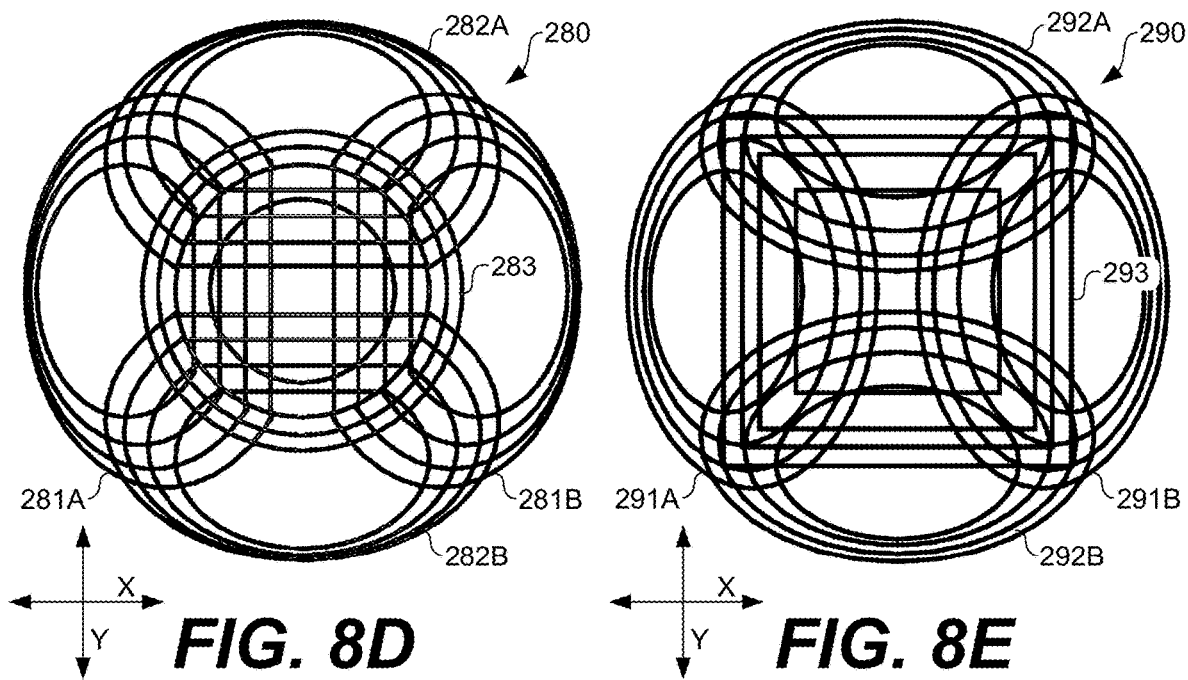
FIG. 8D illustrates another planar coil arrangement according to various aspects of the embodiments described herein.
FIG. 8E illustrates another planar coil arrangement according to various aspects of the embodiments described herein.

FIG. 8D illustrates another planar coil arrangement 280 according to various aspects of the embodiments described herein. The platform 60 can incorporate or include the planar coil arrangement 280. The planar coil arrangement 280 includes a first pair of graduated coils 281A, 281B to provide field directivity in a first "X" direction, a second pair of graduated coils 282A, 282B to provide field directivity in a second "Y" direction, and a third coil 283 to provide field directivity in a third "Z" (i.e., out of the page) direction. The coils 281A, 281B, 282A, 282B, and 283 are centered and can overlap each other in some lengths of windings, although the coils are electrically isolated or separated from each other. As compared to the planar coil arrangement 250 shown in FIG. 8A (which is representative), the coils 281A, 281B are graduated oval coils rather than graduated rectangular coils. Similarly, the coils 282A, 282B are graduated oval coils rather than graduated rectangular coils. The planar coil arrangement 280 is one example to reduce parasitic capacitance between windings according to the concepts described herein.

FIG. 8E illustrates another planar coil arrangement 290 according to various aspects of the embodiments described herein. The platform 60 can incorporate or include the planar coil arrangement 290. The planar coil arrangement 290 includes a first pair of graduated coils 291A, 291B to provide field directivity in a first "X" direction, a second pair of graduated coils 292A, 292B to provide field directivity in a second "Y" direction, and a third coil 293 to provide field directivity in a third "Z" (i.e., out of the page) direction. The coils 291A, 291B, 292A, 292B, and 293 are centered and can overlap each other in some lengths of windings, although the coils are electrically isolated or separated from each other. As compared to the planar coil arrangement 250 shown in FIG. 8A (which is representative), the coils 291A, 291B are graduated oval coils rather than graduated rectangular coils. Similarly, the coils 292A, 292B are graduated oval coils rather than graduated rectangular coils. Additionally, the coil 293 is a graduated square coil rather than a graduated circular coil. The planar coil arrangement 290 is one example to reduce parasitic capacitance between windings according to the concepts described herein.

Figure 9:
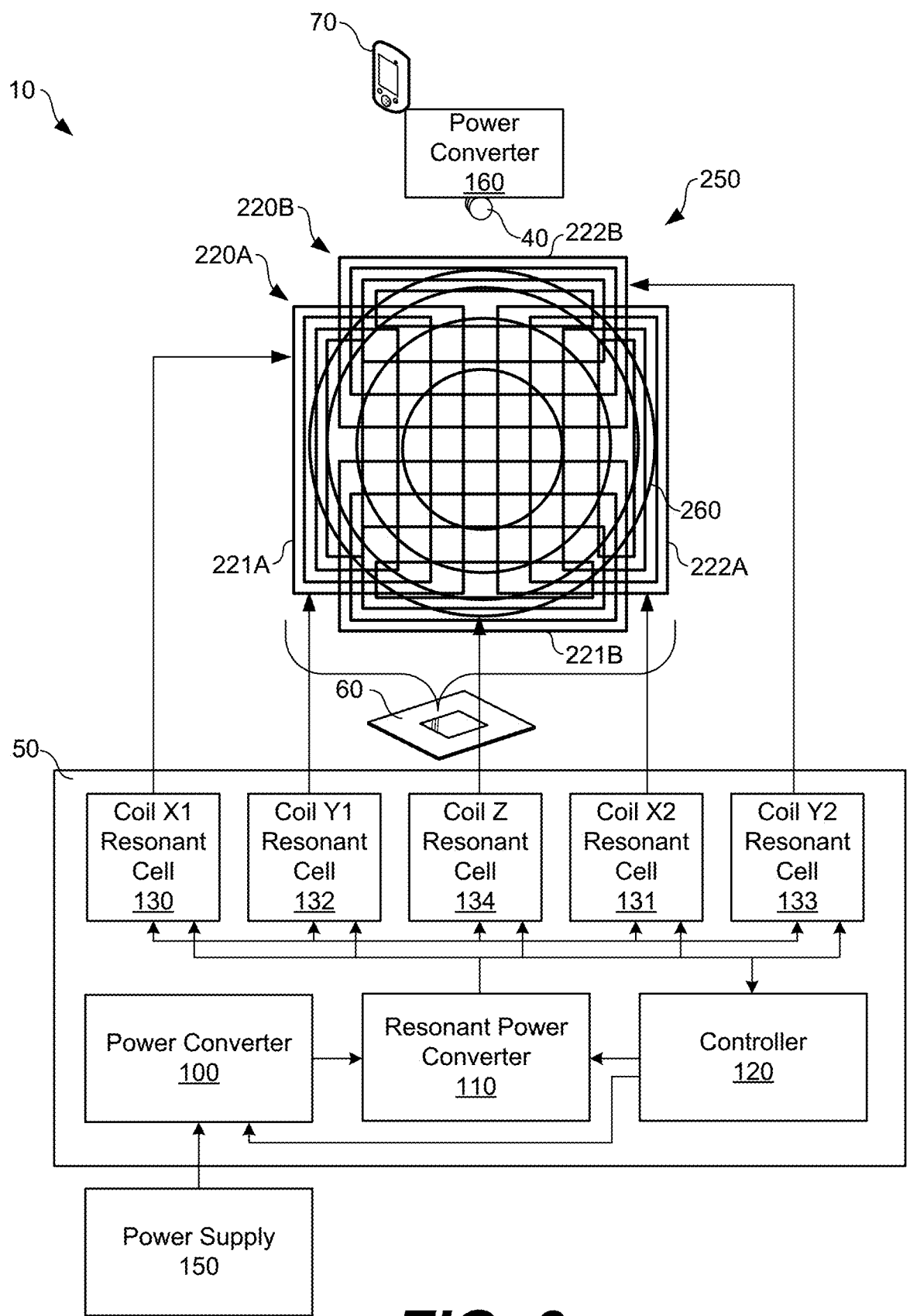
FIG. 9 illustrates other components of the example omnidirectional wireless power transfer system shown in FIG. 3 according to various aspects of the embodiments described herein.

FIG. 9 illustrates other components of the example omnidirectional wireless power transfer system 10 shown in FIG. 3 according to various aspects of the embodiments described herein. Among other components, the power transfer controller 50 includes the power converter 100, resonant power converter 110, controller 120, and resonant cells 130-134. FIG. 9 also illustrates a power supply 150 for the power transfer controller 50. As described herein, the power transfer controller 50 can transfer power to the device 70, which includes the coil 40 and a power converter 160. The resonant cells 130-134 are electrically coupled in a closed circuit with the coils 221A, 222A, 221B, 222B, and 260, respectively, and the coils 221A, 222A, 221B, 222B, and 260 can be considered circuit elements in the resonant cells 130-134.

The power supply 150 can be embodied as any suitable supply of power for the power transfer controller 50. In that context, the supply of power can be provided from line or bulk power, one or more batteries or other charge stores, or other power supplies. In various cases, the supply of power can be provided in the form of alternating or direct current at suitable level of potential.

The power converter 100 is configured to convert the power provided by the power supply 150 to power suitable for the resonant power converter 110. In that context, the power converter 100 can be embodied as any suitable topology of power converter, such as a switch mode converter including a buck or boost arrangement of switching power transistors, for example. In one case, the power converter 100 can be embodied as a buck converter to step down power provided by the power supply 150 at a first, higher DC voltage to power for the resonant power converter 110 at a second, lower DC voltage. In some cases, the controller 120 can provide one or more modulated control signals to the power converter 100 to control the duty cycle of its switching power devices and, thus, the supply of power to the resonant power converter 110, although the power converter 100 can operate in other cases without any external control. In some cases, the function of power converter 100 can also be achieved by controlling the duty cycle of the resonant power converter 110, and the power converter 100 can be eliminated.

As discussed in further detail below with reference to FIG. 10, the resonant power converter 110 forms, in part, a number of resonant circuits along with the resonant cells 130-134, the coils 221A, 222A, 221B, 222B, and 260, the coil 40 of the device 70, and the power converter 160 of the device 70. The resonant power converter 110 can include a number of switching transistors in one or more switch banks. In that context, the resonant power converter 110 is configured to feed charge from the power converter 100 to a transmitter-side resonant tank in each of the resonant cells 130-134. Various examples of transmitter-side resonant tank circuits that can be used for the resonant cells 130-134 are described below. From the resonant cells 130-134, power is inductively coupled through one or more of the coils 221A, 222A, 221B, 222B, and 260, to the coil 40 of the device 70, and to a receiver-side resonant tank in the power converter 160 of the device 70. Examples of receiver-side resonant tank circuits for the power converter 160 are also described below. According to one aspect of the embodiments, the transmitter-side and receiver-side resonant tank circuits can be designed for coupling independent resonance with ZVS operation, although ZVS operation is not a requirement.

As noted above, the resonant power converter 110 includes circuitry to supply RF power (e.g., high frequency sinusoidal alternating current) to drive the resonant tank circuits in the resonant cells 130-134. In one case, the resonant power converter 110 includes a switch bank of one or more switching transistors for each of the resonant cells 130-134, and the resonant power converter 110 can supply RF power separately to each of the resonant cells 130-134. In that case, the resonant power converter 110 is representative of a number of different resonant power converters for each of the resonant cells 130-134, and modulated RF power can be provided respectively to each of the resonant cells 130-134. The RF power can be respectively modulated in amplitude and/or phase through transistor switching control, modulation circuitry, or other circuitry directed by one or more control signals provided from the controller 120.

In another case, the resonant power converter 110 includes a switch bank for one or more pairs of the resonant cells 130-134, such as fort the X, Y, and Z coils. In that case, modulated RF power can be provided to the X1 and X2 resonant cells 130 and 131, to the Y1 and Y2 resonant cells 132 and 133, and to the Z resonant cell 134. The RF power can be modulated respectively in amplitude and/or phase for the X, Y, and Z coils through transistor switching control, modulation circuitry, or other circuitry directed by one or more control signals provided from the controller 120.

The wireless power transfer system 10 and the resonant cells 130-134 can operate at any suitable frequency for wireless power transfer. The AirFuel™ wireless power transfer standard uses an operating frequency of 6.78 MHz, as one example. The resonant cells 130-134 can operate at 6.78 MHz, but higher and lower frequencies can be relied upon. The Qi standard for wireless charging, as another example, uses a lower frequency of 140 kHz, and the resonant cells 130-134 can operate at 140 kHz. The wireless power transfer system 10 and the resonant cells 130-134 can operate at lower or higher operating frequencies in other cases. Lower frequencies can be relied upon in some cases to charge a larger number of devices over a larger surface area and distance. Thus, the resonant cells 130-134 can operate at any suitable frequency for wireless power transfer. The resonant cells 130-134 can also operate over a range of different operating frequencies over time, to better match mutual inductance and power transfer to various devices over time.

In other cases, the resonant power converter 110 can generate RF power for the resonant cells 130-134, collectively, and include a one or more amplitude and/or phase modulation circuits to generate a number of amplitude and/or phase modulated versions of the RF power for the resonant cells 130-134. In any case, the resonant power converter 110 includes circuitry to supply power that drives the resonant tank circuits in the resonant cells 130-134 for near-field resonant inductive coupling of power to the coil 40 of the device 70, among coils of other devices.

The controller 120 can be embodied as one or more processors and related circuitry to support the processors, such as one or more memory devices, crystal oscillators, linear regulators, analog-to-digital converters, digital-to-analog converters, local interfaces, etc. The local interface can include, for example, a data bus with an accompanying address/control bus between memory devices and processors. The processor can include a general- or specific-purpose processor, such as a microprocessor, microcontroller, digital signal processor, or other processing circuitry. The controller 120 can also be embodied, at least in part, as one or more discrete logic circuits, application specific integrated circuits (ASICs), programmable logic devices (e.g., field-programmable gate array (FPGAs), and complex programmable logic devices (CPLDs)).

In some cases, one or more processors of the controller 120 can execute computer-readable software or program instructions embodied in a non-transitory computer-readable medium (e.g., memory device). Through execution of the instructions, the controller 120 can be directed to perform one or more of the operations described herein. In other cases, the controller 120 can be designed to conduct or perform the operations described herein without the execution of software.

The controller 120 is configured to control the overall operation of the power transfer controller 50 and the transmission of power to devices. For example, the controller 120 is configured to control the resonant power converter 110 to activate (e.g., provide RF power to) one or more of the resonant cells 130-134. In that way, the controller 120 can direct and control the wireless transmission of power to the device 70. For example, the controller 120 can generate one or more control signals to direct the resonant power converter 110 to generate RF power to induce resonant, inductive power transfer between magnetic-field-coupled coils in the resonant cell 130 and the coil 40 of the device 70. Similarly, the controller 120 can direct the resonant power converter 110 to induce power transfer between magnetic-field-coupled coils in any combination of one or more of the resonant cells 130-134 and the coil 40 of the device 70.

Further, the controller 120 can direct the resonant power converter 110 to generate RF power at a certain frequency, amplitude, and/or phase for the resonant cell 130 and the other resonant cells 131-134, respectively. Thus, the controller 120 can control whether RF power is provided, as well as the frequency, amplitude, and phase of that RF power, to each of the resonant cells 130-134 individually. The manner in which the resonant cells 130-134 can be excited in the power transfer controller 50 is thus flexible, as various combinations of the coils 221A, 222A, 221B, 222B, and 260 can be selectively excited in various ways through the resonant cells 130-134 to induce a preferred magnitude and direction of the magnetic field over or around the platform 60. In effect, the magnitude and direction of the magnetic field can be adjusted to account for different positions and orientations the coil 40 of the device 70 and similar coils of other devices over the platform 60.

For example, if the device 70 is placed over and rests flat on the platform 60 near a center of the coil 260, then the controller 120 can direct the resonant power converter 110 to generate RF power for the resonant cell 134 and the coil 260. Because of the position and orientation of the coil 40 of the device 70 with respect to the coil 260 in that case, the excitation of the coil 260 is likely to lead to a relatively high power transfer through resonant inductive coupling, at least as compared to an excitation of the other coils 221A, 222A, 221B, 222B.

When the device 70 is first placed over the platform 60, however, the power transfer controller 50 may not know the position and orientation at which the device 70 was placed or settled. Thus, the controller 120 is configured to sense a level of power transferred (or that can be transferred) to the device 70 by exciting each of the resonant cells 130-134 (and, hence, the coils 221A, 222A, 221B, 222B, and 260) individually over time. For example, the controller 120 can direct the resonant power converter 110 to provide RF power to each of the resonant cells 130-134, individually, and to measure the amount of power transferred to the device 30 by each one. The power transfer can be measured or sensed using any suitable techniques, such as through the identification of voltage drops or droops, the amount of current supplied, or other approaches. In that way, the controller 120 can identify a coefficient of power transfer or resonant inductive coupling between individual ones of the resonant cells 130-134 (and the coils 221A, 222A, 221B, 222B, and 260) and the coil 40 of the device 70, respectively.

The controller 120 can also sense a level of power transferred to the device 70 by the excitation of one or more combinations of the resonant cells 130-134 over time. In that case, the controller 120 can direct the resonant power converter 110 to provide RF power to various combinations of the resonant cells 130-134 over time and measure the amount of power transferred for each combination. Additionally, the RF power provided to respective ones of the resonant cells 130-134 can be modulated in amplitude and/or phase as compared to each other, and the controller 120 can measure the amount of power transferred for various combinations of that modulated power.

Various combinations of the coils 221A, 222A, 221B, 222B, and 260 can be excited over time to induce rotating and, as averaged over time, omnidirectional magnetic fields. Thus, rotating magnetic fields in different planes can be induced over the platform 60. Also, by exciting one or more of the coils 221A, 222A, 221B, 222B, and 260, respectively, for different periods of time, using different amplitudes, and/or different phases of high frequency sinusoidal alternating current, omnidirectional magnetic fields can be induced over the platform 60 in an average sense.

Additionally, the coils 221A, 222A, 221B, 222B, and 260 can be excited simultaneously to induce a three-dimensional rotating magnetic field over the platform 60. One example of the excitation currents that can be provided to the coils 221A, 222A, 221B, 222B, and 260 is similar to that shown in FIG. 2B. For that example case, the magnetic field distribution provided over the platform 60 at different time instants was simulated with finite element analysis (FEA) software. The magnetic field distribution was shown to shift over time between upward, downward, right, and left directions, among others.

Thus, the controller 120 can achieve an omnidirectional magnetic field over the platform 60 through controlled excitation of the resonant cells 130-134 and the coils 221A, 222A, 221B, 222B, and 260. The excitation examples described herein are not exhaustive, however, and other ways are within the scope of the embodiments. With so many flexible ways of excitation, the proposed arrangement of the coils 221A, 222A, 221B, 222B, and 260 in the platform 60 can achieve omnidirectional wireless power transfer. Overall, the magnetic field distribution above the platform 60 can vary omnidirectionally over time, and an omnidirectional field distribution is induced in the region above the platform 60. Therefore, there is no need to align the receiver coil 40 of the device 70 in any particular orientation with respect to the platform 60. The power transfer controller 50 can transfer energy to the device 70, among others, in any direction, and the freedom of charging orientation is greatly improved.

Turing to other aspects of the embodiments, one challenge in the design of resonant converters is to design for ZVS operation of the switching devices. A recommended switching frequency of the AirFuel™ wireless power transfer standard is 6.78 MHz. The use of such high switching frequencies can be detrimental to switching devices unless resonant converters are designed for ZVS operation. Without ZVS operation, switching losses can be relatively high and efficiency suffers. Additionally, electromagnetic compatibility of the system can also be a concern for designs that fail to account for ZVS operation.

Figure 10:
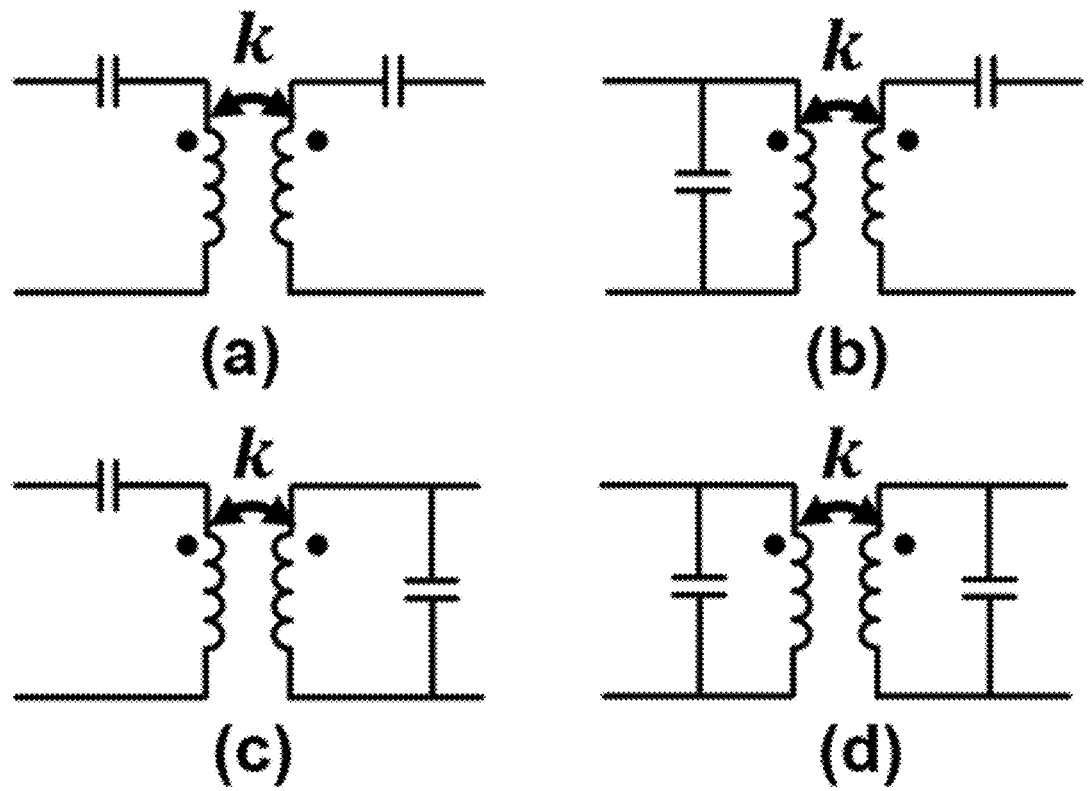
FIG. 10 illustrates four example resonant tank topologies according to various aspects of the embodiments described herein.

FIG. 10 illustrates example resonant tank topologies according to various aspects of the embodiments described herein. Particularly, FIG. 10 illustrates a series-series resonant tank at pane (a), a parallel-series resonant tank at pane (b), a series-parallel resonant tank at pane (c), and a parallel-parallel resonant tank at pane (d). Among the four resonant tank topologies shown in FIG. 10, the series-series resonant converter is widely used. The wireless power transfer system 10 and the planar coil arrangements described above can be used with any suitable resonant circuit technology, at any suitable operating frequency. FIG. 10, and the other figures described below, illustrate example resonant circuit topologies, but the embodiments are not limited to use with the examples provided.

In the example resonant tank topologies shown in FIG. 10, k is a coupling metric related to the level of inductive coupling between the transmitter coil and the receiver coil. In practice, the value of k may be based on the position and orientation of the receiver coils in the receiver-side resonant tanks as compared to the transmitter coils of the transmitter-side resonant tanks. In other words, as discussed above, in a wireless power transfer system where a user is expected to set or place an electronic device including a receiver coil into a charging receptacle, the position and orientation of the receiver coil (with respect to the transmitter coil) is dependent on the user's placement of the device and will vary. Thus, the value of k can vary dependent on the user's placement of the device into the charging receptacle.

Figure 11:
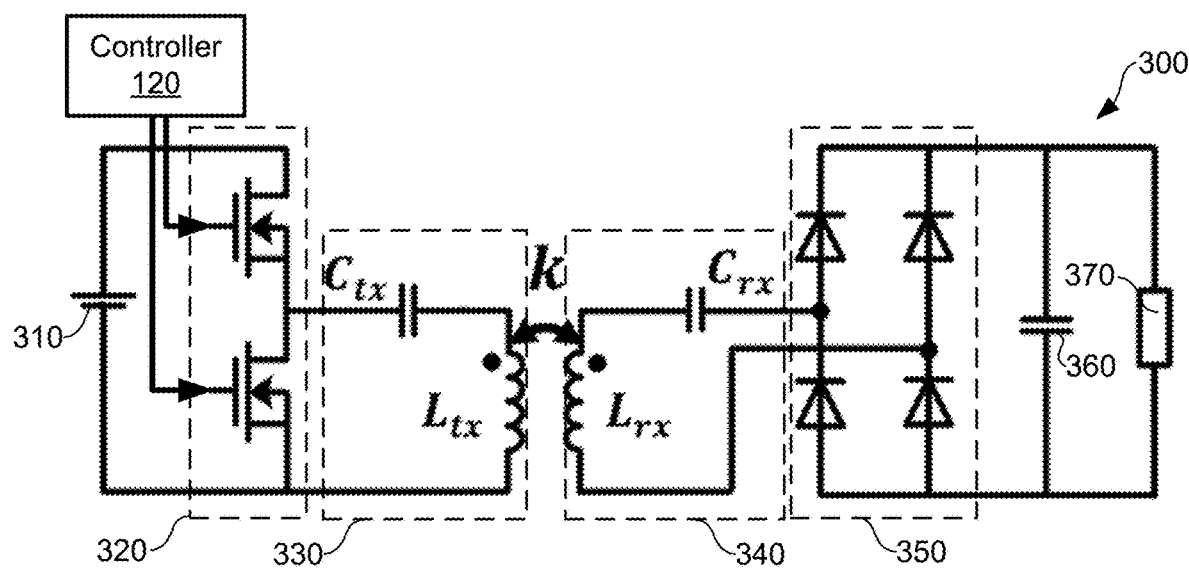
FIG. 11 illustrates an example series-series resonant converter topology according to various aspects of the embodiments described herein.

FIG. 11 illustrates an example resonant converter 300 incorporating series-series resonant tank topology according to various aspects of the embodiments described herein. At the transmitter side of the resonant converter 300, a power source 310 supplies charge to a switch bank 320, which is configured to feed charge to a transmitter-side resonant tank 330. The resonant converter 300 also includes a receiver-side resonant tank 340, a rectifier bank 350, a bulk charge store 360, and a load 370. The resonant converter 300 is representative and provided for context to describe certain features and advantages of the embodiments. Other circuit elements (and variations of the circuit elements shown) can be relied upon in various embodiments.

In FIG. 11, the power source 310 is representative of any suitable supply of power for the resonant converter 300. The switch bank 320 includes an arrangement of switching transistors. Although designs using a single transistor are possible, half bridge and full bridge arrangements of transistors can be used to drive the transmitter-side resonant tank 330 more efficiently, and a half bridge is shown for the switch bank 320 in FIG. 11. The transmitter-side resonant tank 330 and the receiver-side resonant tank 340 include combinations of capacitive and inductive circuit elements that form a series-series resonant tank topology. The transmitter-side resonant tank 330 in FIG. 11 includes a resonant capacitor $C_{tx}$ and transmitter coil $L_{tx}$, and the receiver-side resonant tank 340 includes the resonant capacitor $C_{rx}$ and receiver coil $L_{rx}$. The resonant capacitor $C_{tx}$ transmitter coil $L_{tx}$, resonant capacitor $C_{rx}$, and receiver coil $L_{rx}$ can be selected for use with a resonant operating frequency for near-field resonant inductive coupling.

Other combinations of capacitive and inductive circuit elements for other converter topologies, including those shown in the other figures, can be used. The rectifier bank 350 includes an arrangement of diodes to rectify the flow of power which is inductively coupled from the transmitter-side resonant tank 330 to the receiver-side resonant tank 340 for storage into the bulk charge store 360. Any suitable arrangement of diodes (e.g., half bridge, full bridge, etc.) can be used in the rectifier bank 350.

Here, it is noted that the power source 310 is representative of a supply of power, such as the supply of power provided by the power converter 100 shown in FIG. 9. Further, the resonant power converter 110 shown in FIG. 9 can include a switch bank similar to the switch bank 320 for each of the resonant cells 130-133, and the switching transistors can be controlled by control signals provided by the controller 120. Each of the resonant cells 130-133 shown in FIG. 9 can include a transmitter-side resonant tank similar to the transmitter-side resonant tank 330. Similarly, each of the coils 221A, 222A, 221B, 222B, and 260 shown in FIG. 9 can include a transmitter coil similar to the transmitter coil $L_{tx}$. The power converter 160 for the device 70 shown in FIG. 9 can include a receiver-side resonant tank similar to the receiver-side resonant tank 340, and the coil 40 of the device 70 can include a receiver coil similar to the receiver coil $L_{rx}$.

Figure 12:
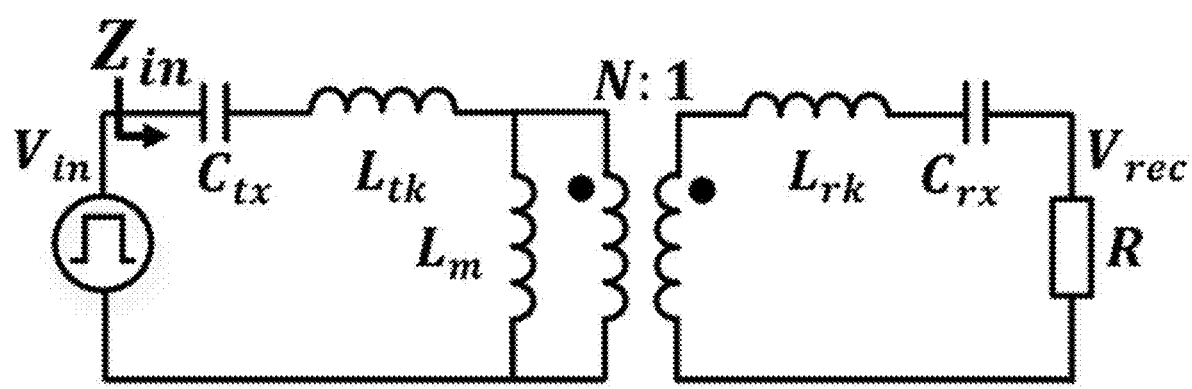
FIG. 12 illustrates an example equivalent circuit of the example series-series resonant converter shown in FIG. 11 according to various aspects of the embodiments described herein.

FIG. 12 illustrates an example AC equivalent circuit of the series-series resonant converter shown in FIG. 11 with a T model of the transformer. Based on the equivalent circuit, voltage gain and phase of input impedance curves are shown for different load resistances and resonant couplings in FIGS. 13 and 14. The k=0.4 case of coupling is shown in FIG. 13, and the k=0.2 case of coupling is shown in FIG. 14.

Figure 13:
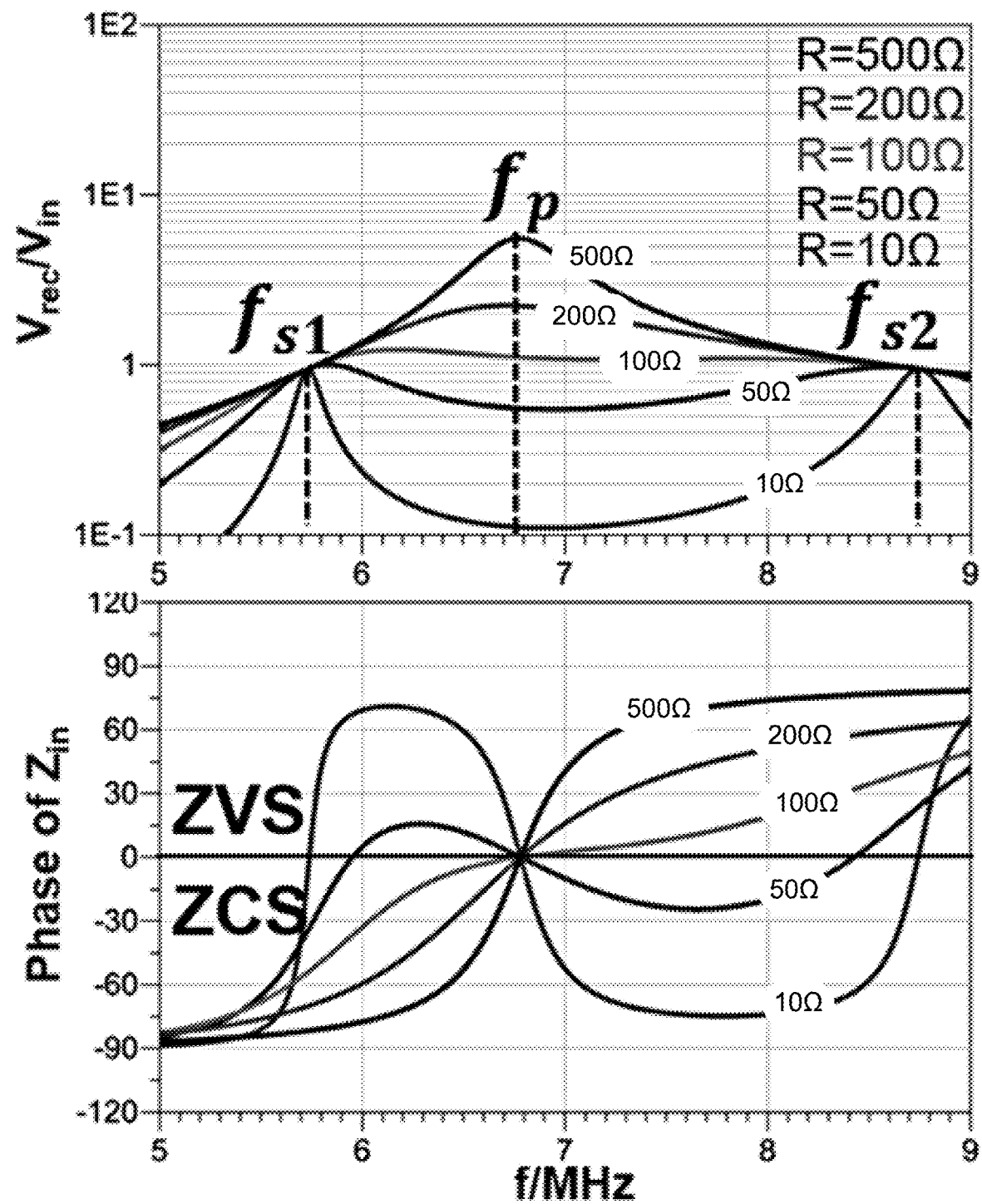
FIGS. 13 and 14 illustrate voltage gain and phase of input impedance curves for different load resistances and resonant couplings according to various aspects of the embodiments described herein.
Figure 14:
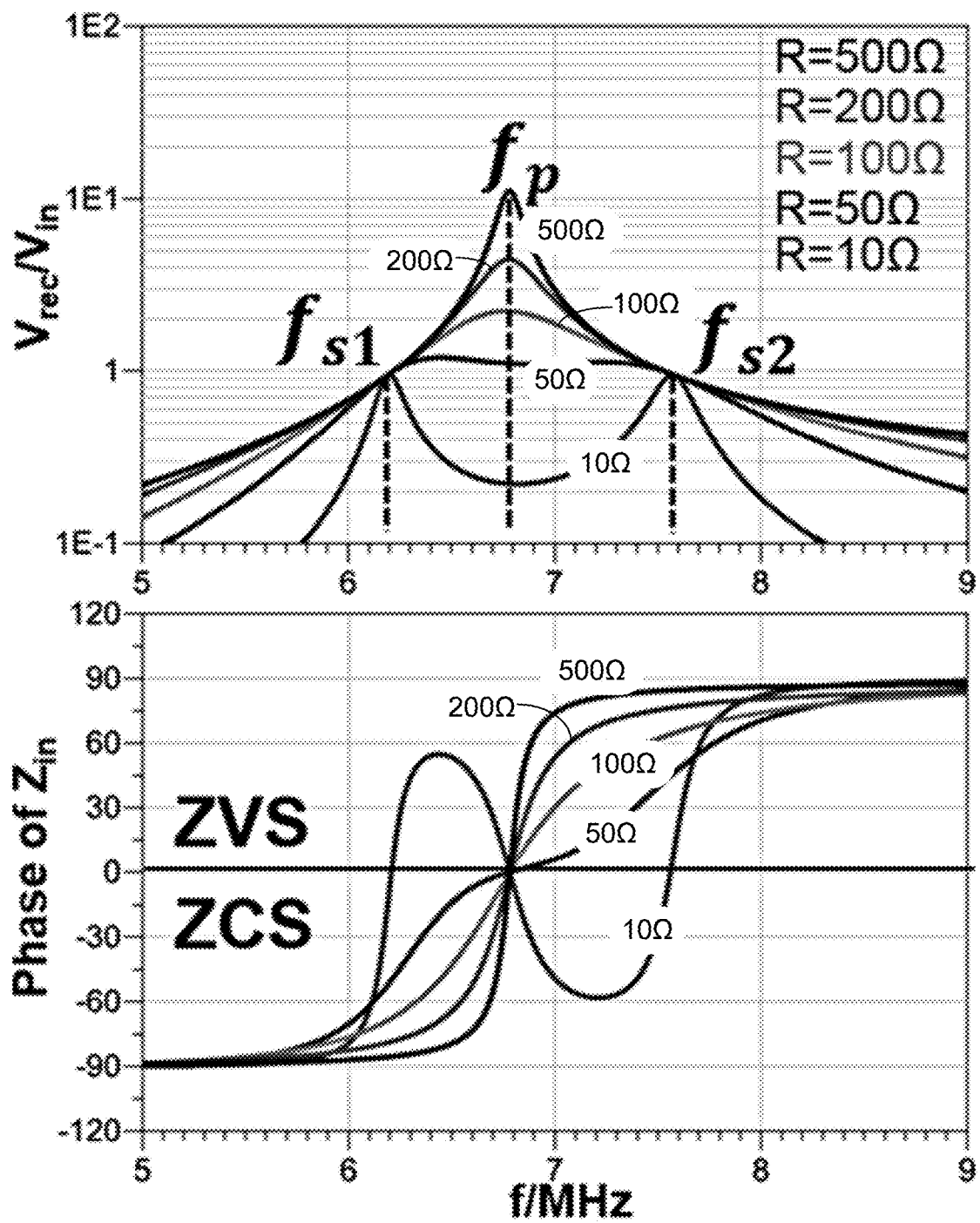

According to the voltage gain curves in FIGS. 13 and 14, there are three resonant frequencies in the series-series resonant converter topology, including two series resonant frequencies $f_{s1}$, $f_{s2}$ and one parallel resonant frequency $f_p$. The expressions for these three resonant frequency are:

$$f_{s1} = \frac{1}{2\pi\sqrt{(1+k)L_{tx}C_{tx}}}, \tag{7}$$

$$f_{s2} = \frac{1}{2\pi\sqrt{(1-k)L_{tx}C_{tx}}}, \text{ and} \tag{8}$$

$$f_p = \frac{1}{2\pi\sqrt{L_{tx}C_{tx}}}. \tag{9}$$

According to the expressions, the two series resonant frequencies (SRFs) are coupling dependent and the parallel resonant frequency (PRF) is coupling independent. Therefore, the SRFs move and the PRF is fixed when the resonant coupling of the series-series resonant converter changes as shown in FIGS. 13 and 14. Further, for different load conditions, the voltage gain can change dramatically for the PRF. This variable voltage gain can be a challenge for system controllability in voltage output applications. For example, as discussed above, the load presented by electronic devices can vary as the load presented by a battery varies based on the different charging stages in the charging profile of the battery. However, the SRFs exhibit load-independent voltage gain, which is desirable from controllability point of view.

Compatible inductive input impedance is important for ZVS operation of switching devices in half bridges and related switching topologies. The phase of input impedance with different loads is also shown in FIGS. 13 and 14. As shown, the input impedance is resistive at the PRF, which is at the boundary between the ZVS and zero current switching (ZCS) regions. Therefore, ZVS operation can be lost around the PRF due to component tolerances. For the first SRF at $f_{s1}$, the input impedance is capacitive in most load ranges. Thus, ZVS operation is not available. On the contrary, ZVS operation can be achieved in most load SRF ranges at $f_{s2}$.

In summary, the resonant frequency characteristics of series-series resonant converters is that, for SRF $f_{s1}$: moving SRF with variable coupling, and no ZVS operation in most load ranges. For SRF $f_{s2}$: moving SRF with variable coupling, ZVS operation in most load ranges. For PRF $f_p$: variable voltage gain with different loads, ZVS operation cannot be guaranteed.

Thus, there is no good operating region with variable coupling and load in series-series resonant converters. At the same time, parallel-series and parallel-parallel resonant converters are most suitable for current source input applications. In real applications, current source input applications are relatively difficult to implement, and those two topologies are not considered here. The series-parallel resonant converter has one moving SRF with variable coupling, which is similar to the series-series resonant converter. Thus, the four basic resonant topologies shown in FIG. 10 are not ideal to solve the challenges of varying coupling and load conditions in wireless power transfer applications.

Figure 15:
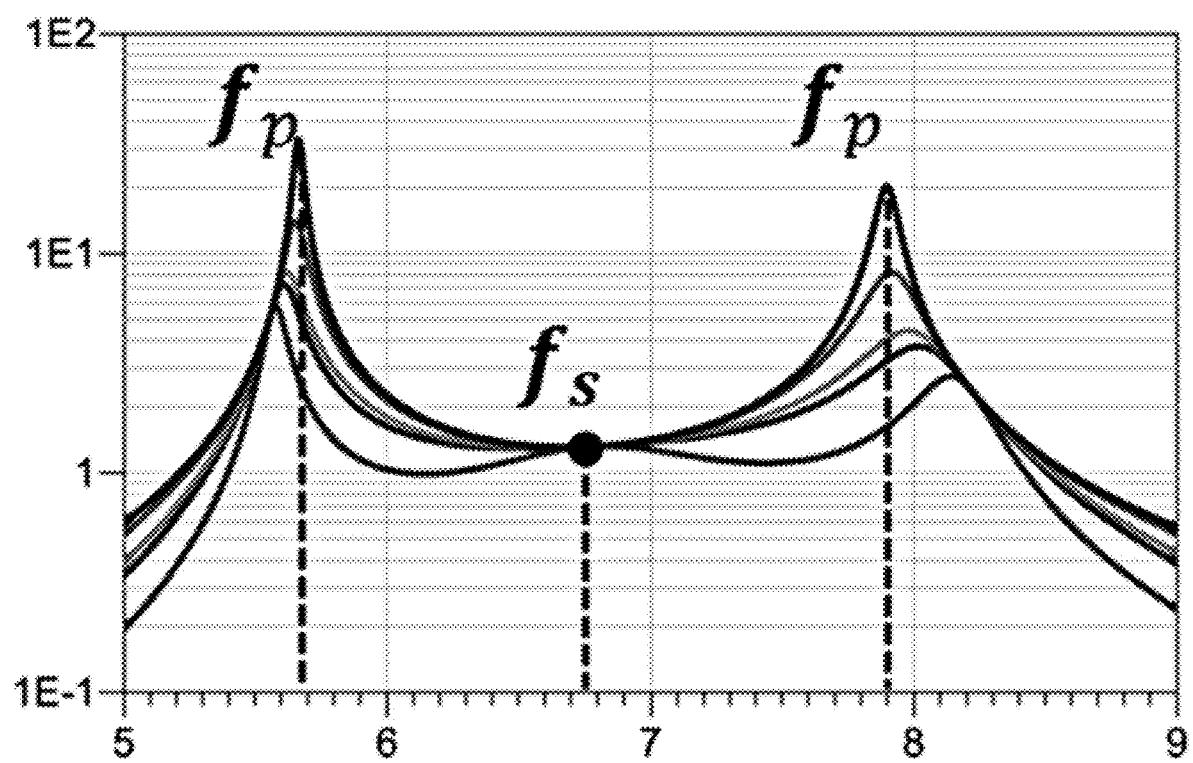
FIG. 15 illustrates gain characteristics of a resonant converter having a series resonant frequency between two parallel resonant frequencies according to various aspects of the embodiments described herein.

As described above, the gain characteristics of series-series resonant converters include two coupling dependent SRFs with load independent voltage gains and one coupling independent PRF with load dependent voltage gain, and the PRF is in the center of the SRFs. Therefore, the center resonance is coupling independent. Similarly, gain characteristics with one SRF in the center of two PRFs can achieve coupling and load independent resonance. One example of gain characteristics with one SRF in the center of two PRFs is shown in FIG. 15. With the type of gain characteristics shown in FIG. 15, coupling and load independent resonance can be achieved for near-field wireless power transfer at the center SRF. At the same time, at the left SRF, ZVS can be achieved due to the negative slope of the gain curve. Therefore, a resonant converter with this type of gain characteristics can be used to achieve coupling and load independent resonance with ZVS operation for near-field wireless power transfer.

Figure 16A:
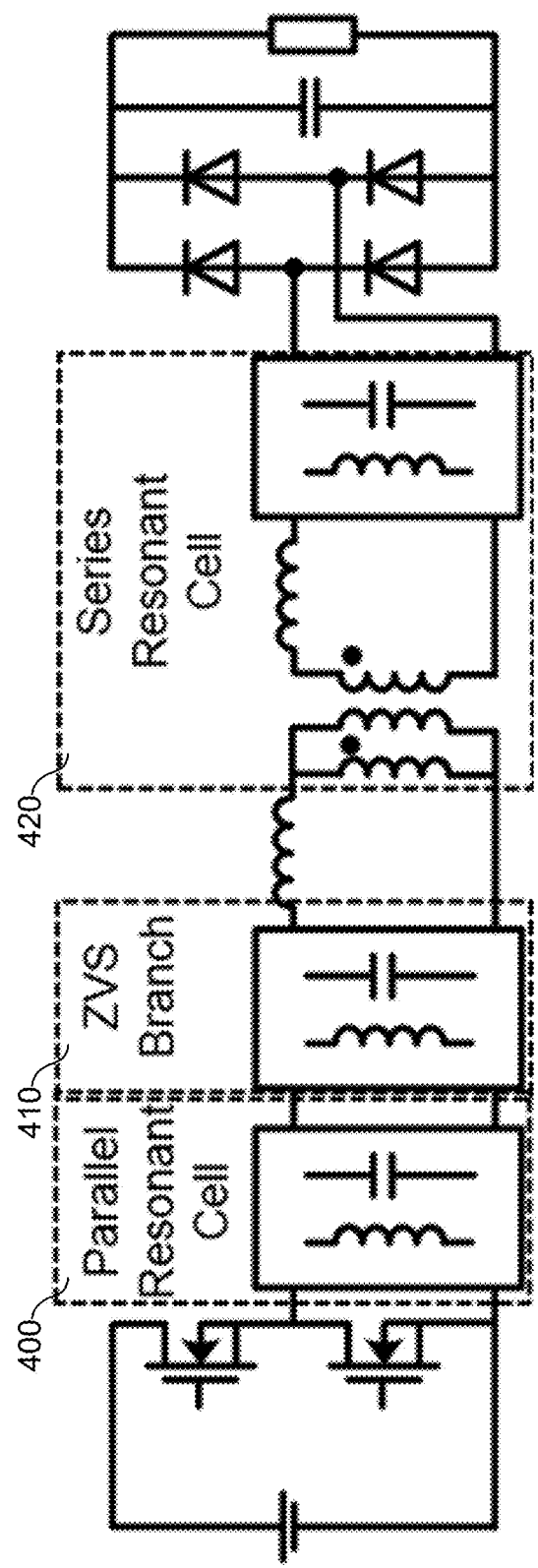
FIGS. 16A-16C illustrate the general topology forms of resonant converters with coupling independent resonance and zero voltage switching according to various aspects of the embodiments described herein.
Figure 16B:
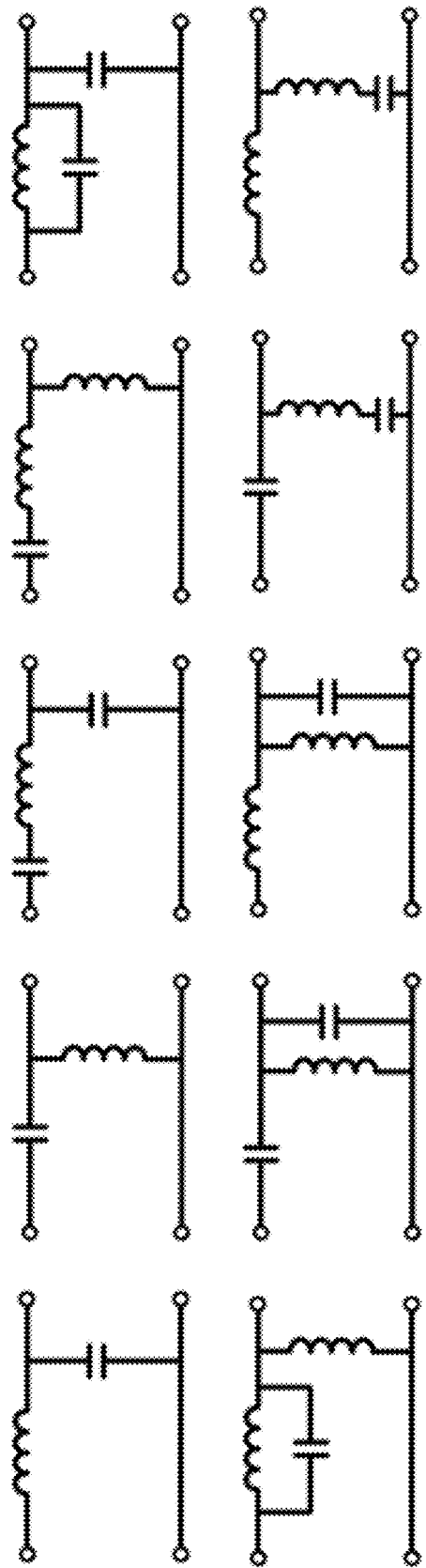
Figure 16C:
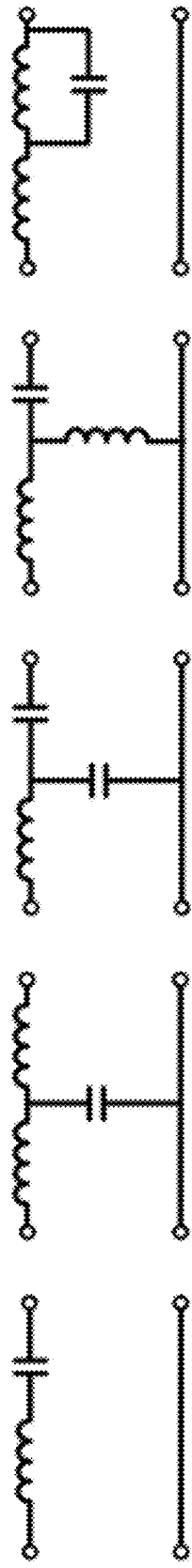

FIG. 16A illustrates the general topology form of a resonant converter with coupling independent resonance and zero voltage switching. The resonant converter shown in FIG. 16 includes a parallel resonant cell 400, a ZVS branch 410, and a series resonant cell 420. The parallel resonant cell 400 can be implemented in many ways. FIG. 16B illustrates example parallel resonant cells 300 implemented with two or three passive components. As shown in FIG. 16, one simple form of the ZVS branch 410 can be a capacitor, which can change the input impedance to inductive to make sure zero voltage switching occurs. However, other, more complicated forms of the ZVS branch 410 with more components can also be used to change the input impedance. The series resonant cell 420 can use the self-inductance of the receiver coil as part of resonant cell. Therefore, there is always an inductor in the left side of series resonant cell. FIG. 16C illustrates example series resonant cells 420 implemented with two or three passive components.

Figure 17:
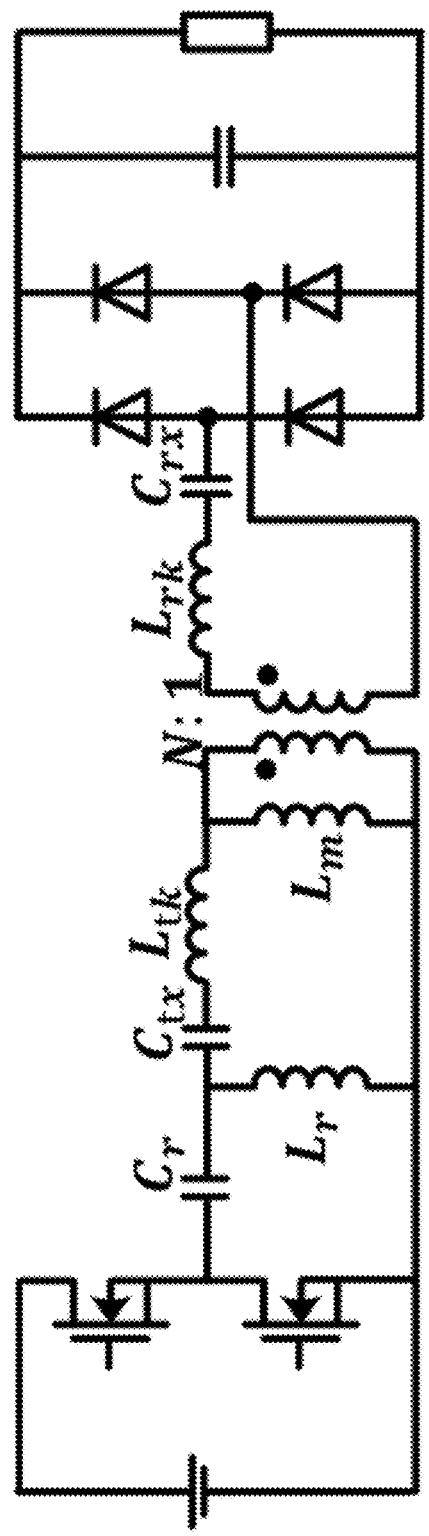
FIG. 17 illustrates a resonant converter having a series resonant frequency between two parallel resonant frequencies according to various aspects of the embodiments described herein.
Figure 18:
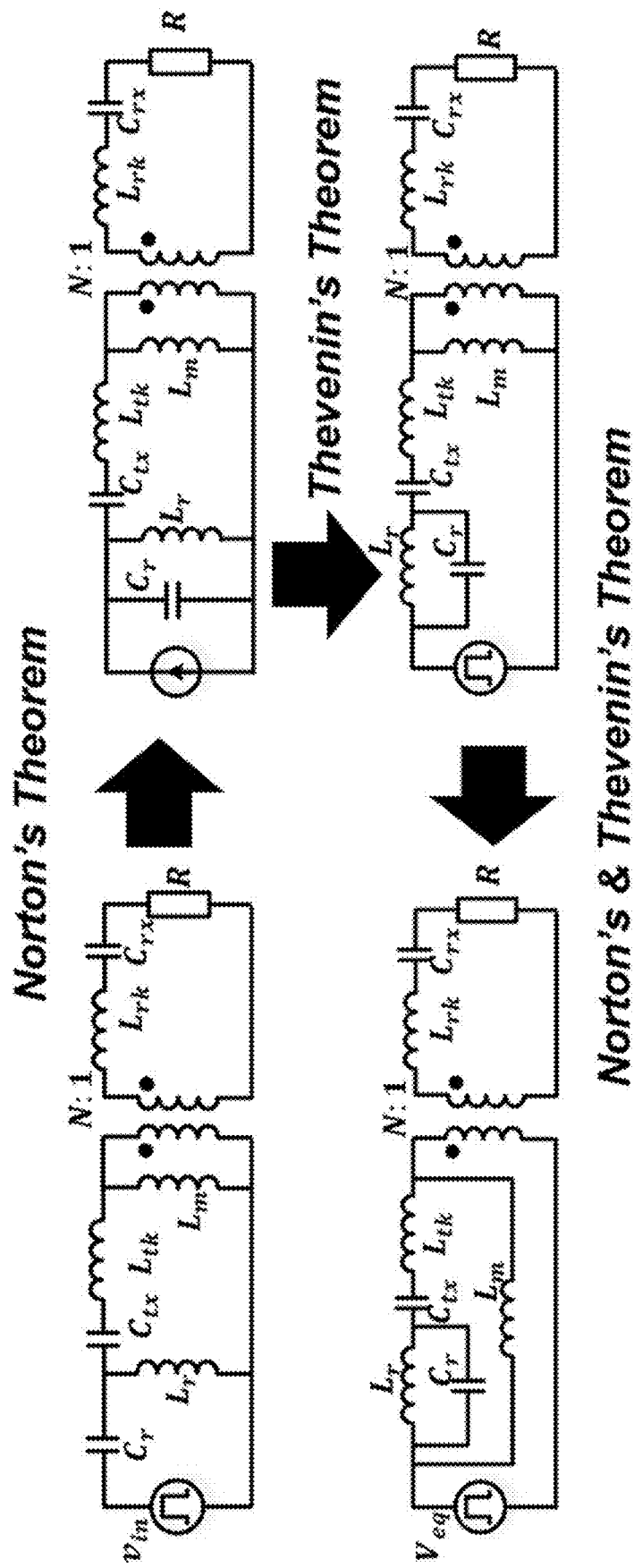
FIG. 18 illustrates an example use of Norton's Theorem and Thevenin's Theorem to transform the resonant tank network shown in FIG. 17 into a simple branch according to various aspects of the embodiments described herein.

One example resonant converter topology, called a CLCL-LC resonant converter, is shown in FIG. 17. To find how the series resonance is formed in the CLCL-LC resonant converter, the use of Norton's Theorem and Thevenin's Theorem is shown in FIG. 18 to transform the relatively complicated resonant tank network into a simple branch in series with a load resistor. Since the input source has no relationship with the resonant frequency of the resonant network, a simple branch with $L_{rk}$ reflected into the primary (transmitter) side, as shown in FIG. 18, has the same SRF as the CLCL-LC resonant converter.

Figure 19:
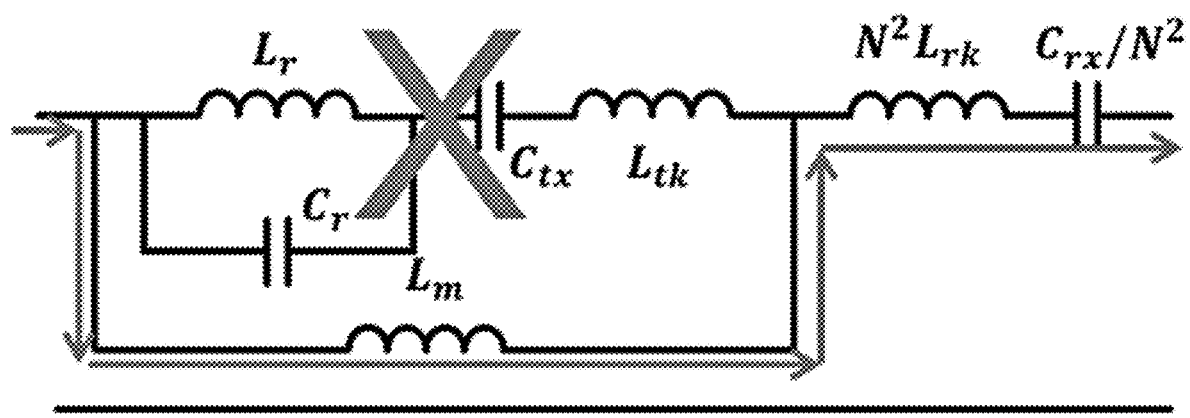
FIG. 19 illustrates the simple branch developed using Norton's Theorem and Thevenin's Theorem from the relatively complicated resonant tank network shown in FIG. 18 according to various aspects of the embodiments described herein.

According to FIG. 19, if $L_r$ and $C_r$ are in resonance, power will go through $L_m$, $L_{rk}$, and $C_{rx}$ due to the high impedance of the parallel resonance. Further, $L_m$ and $L_{rk}$ in series can be equivalent to the self-inductance of the receiver coil, which is coupling independent. If $C_{rx}$ is designed to resonate with $L_{rx}$ at the resonance frequency of $L_r$ and $C_r$, then the CLCL-LC resonant converter will have a coupling independent series resonant frequency given by:

$$f_s = \frac{1}{2\pi\sqrt{L_r C_r}} = \frac{1}{2\pi\sqrt{L_{rx} C_{rx}}}. \tag{10}$$

As for the parallel frequency of the CLCL-LC resonant converter, $L_m$ will join the resonance like LLC. The parallel resonance is formed by $L_r$ and $C_r$ in parallel, and will resonate with $C_{tx}$, $L_{tk}$, $L_m$ in series. The expression for this calculation is given by:

$$\frac{j\omega L_r \cdot \frac{1}{j\omega C_r}}{j\omega L_r + \frac{1}{j\omega C_r}} + j\omega L_{tk} + j\omega L_m + \frac{1}{j\omega C_{tx}} = 0. \tag{11}$$

There are two solutions of expression (11), which means two PRFs exist in CLCL-LC resonant converter. The solutions of expression (11) are relatively complicated and, thus, not shown here. From the result of the solutions, however, one PRF is present on the left side of the SRF and another PRF is present on the right side of the SRF. Intuitively, in low frequency ranges, the series branch ($L_{tk}$, $L_m$, $C_{tx}$) is capacitive, which can be equivalent to a capacitor $C_{eq}$. Therefore, the parallel frequency $$f_{p1} = \frac{1}{2\pi\sqrt{L_r(C_r + C_{eq})}}$$

is in the left side of $f_s$. In high frequency ranges, the series branch ($L_{tk}$, $L_m$, $C_{tx}$) is inductive, which can be equivalent to an inductor $L_{eq}$. So the parallel frequency $$f_{p2} = \frac{1}{2\pi\sqrt{(L_r//L_{eq})C_r}}$$

is in the right side of $f_s$.

Figure 20:
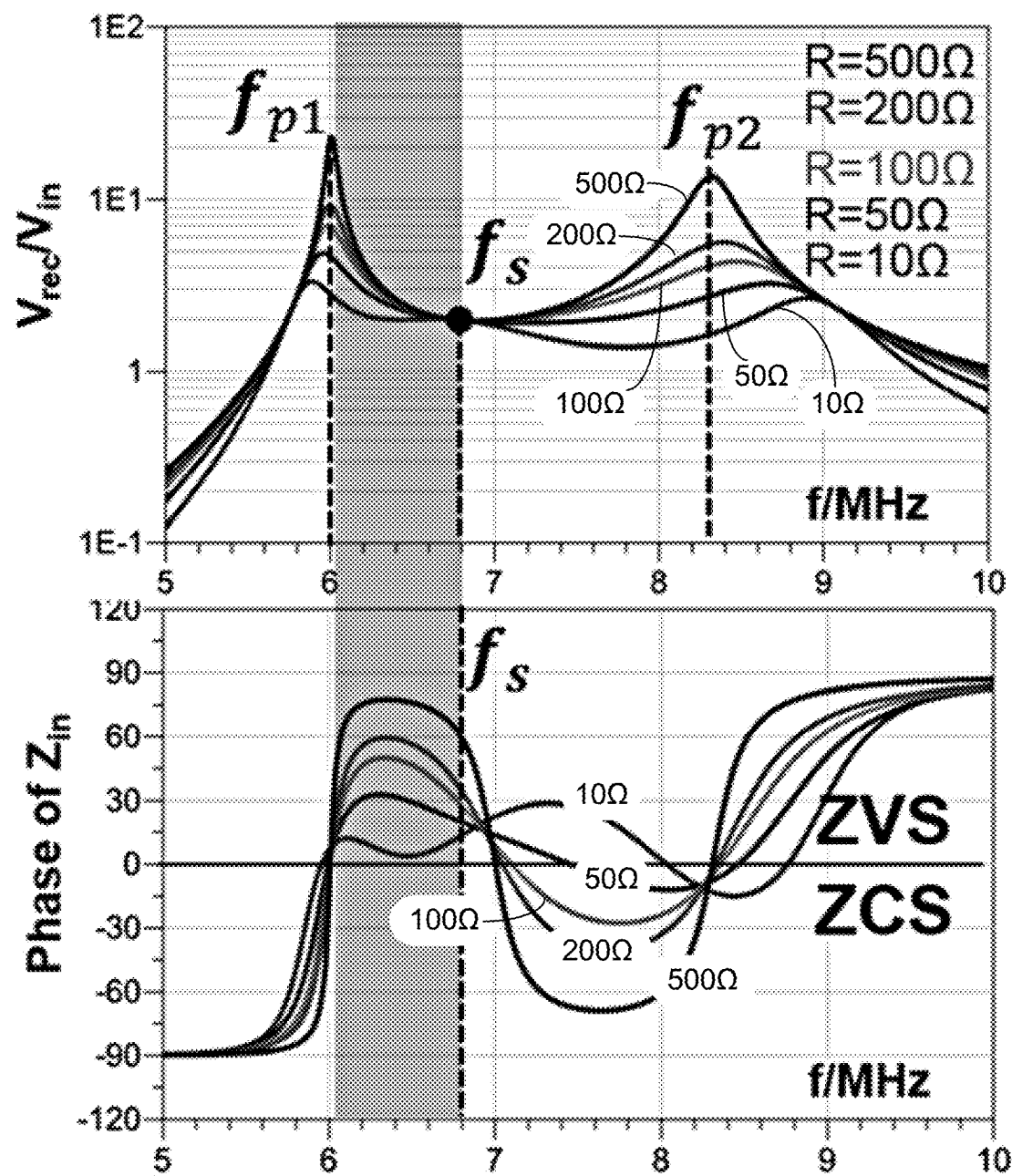
FIGS. 20 and 21 illustrate voltage gain and phase of input impedance curves for different load resistances and resonant couplings of the resonant converter shown in FIG. 16 according to various aspects of the embodiments described herein.
Figure 21:
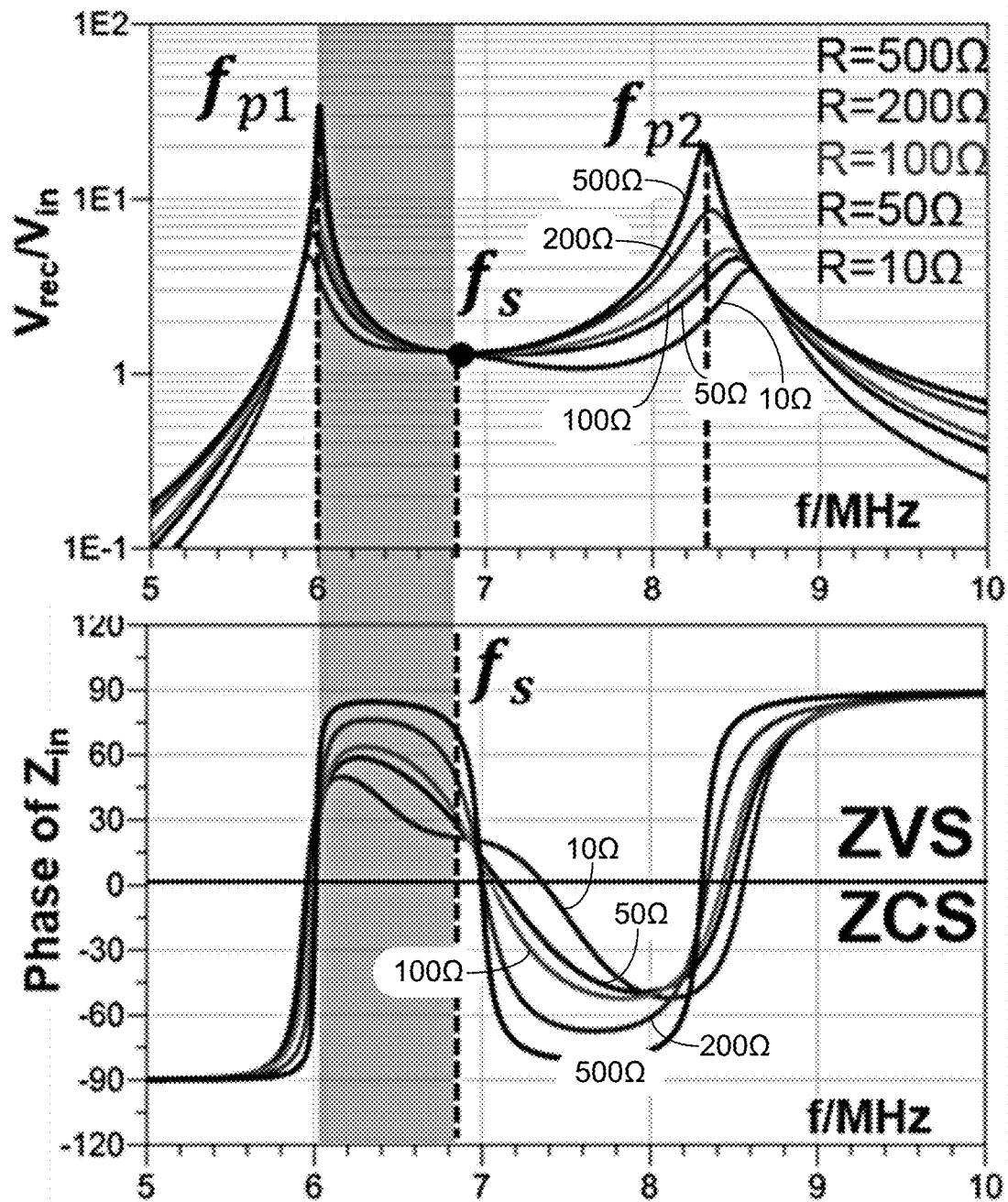

The voltage gain and phase of input impedance curves of the CLCL-LC resonant converter shown in FIG. 17 with different loads and for different couplings are shown in FIGS. 20 and 21. The k=0.4 case of coupling is shown in FIG. 20, and the k=0.2 case of coupling is shown in FIG. 21.

As demonstrated by FIGS. 20 and 21, a coupling independent SRF with ZVS operation is achieved with the CLCL-LC resonant converter topology. The entire shaded region can be selected as the operation region. From the gain curve, there are two PRFs around the fixed SRF, with one PRF on the left side and the other PRF on the right side of the SRF. With this type of gain characteristics, fixed SRF with ZVS operation can be achieved, which is an important concept in the design of coupling independent resonance frequency in variable coupling applications.

Figure 22:
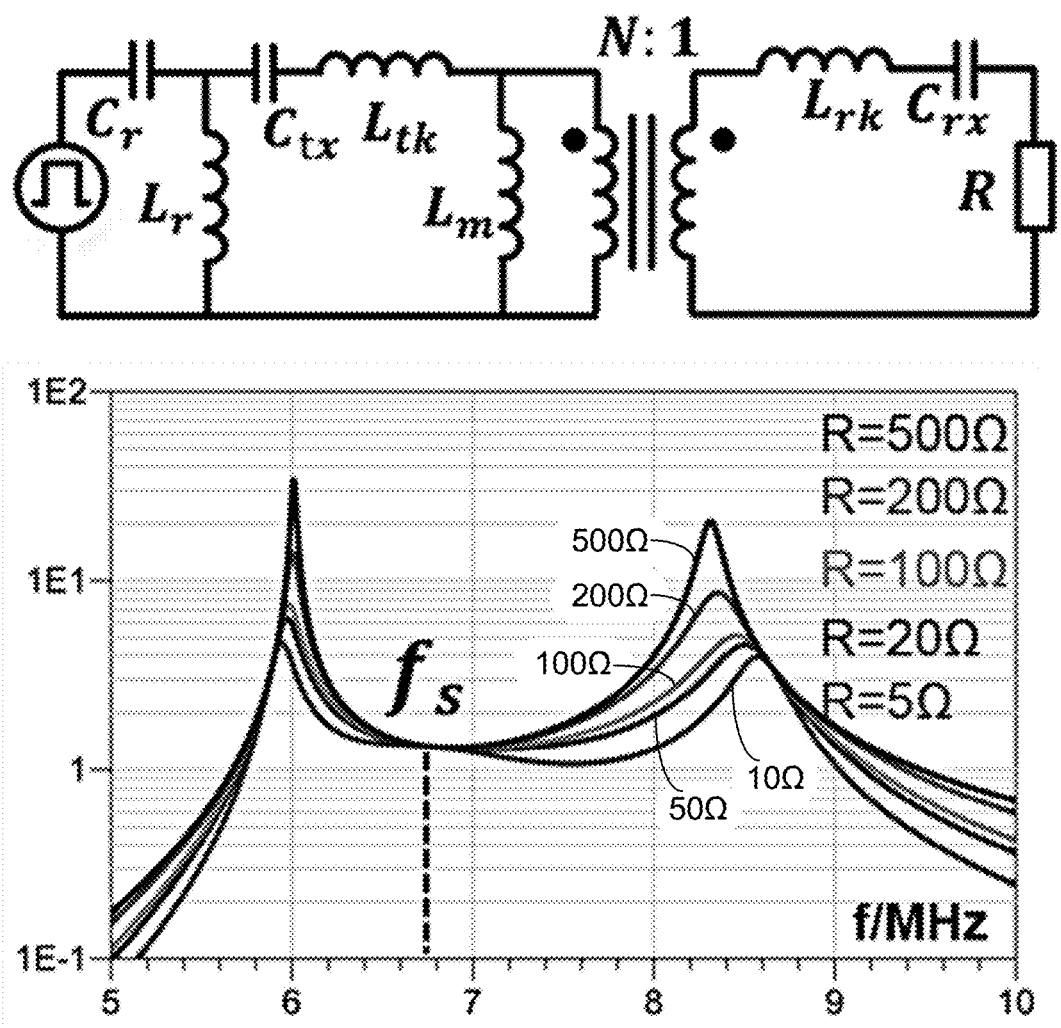
FIGS. 22-26 illustrate other example resonant converter topologies and gain curve characteristics according to various aspects of the embodiments described herein.

In extension to the CLCL-LC resonant converter topology shown in FIG. 17, other topologies of resonant converters with coupling independent resonance and ZVS operation can be found. Some example resonant converter topologies and gain curve characteristics of that type are shown in FIGS. 22-26. FIG. 22 is the CLCL-LC resonant converter topology (similar to that shown in FIG. 17), which is used as a reference for the other topologies.

Figure 23:
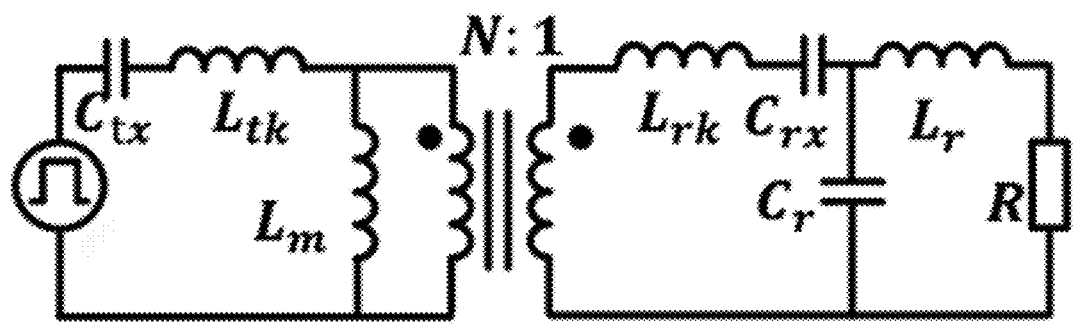
Figure 23:
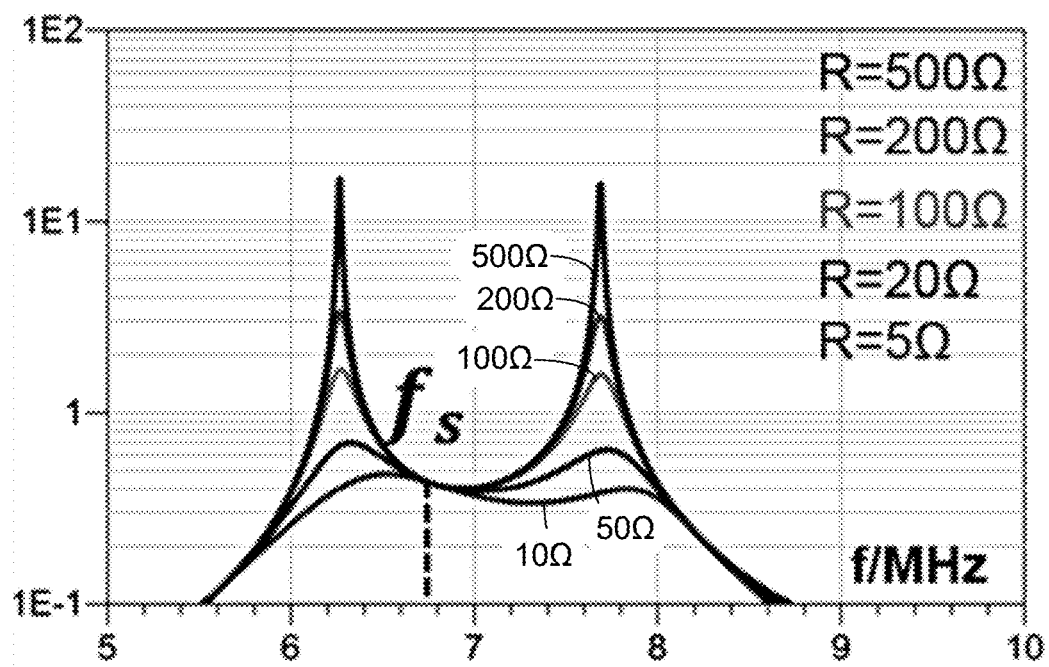
Figure 24:
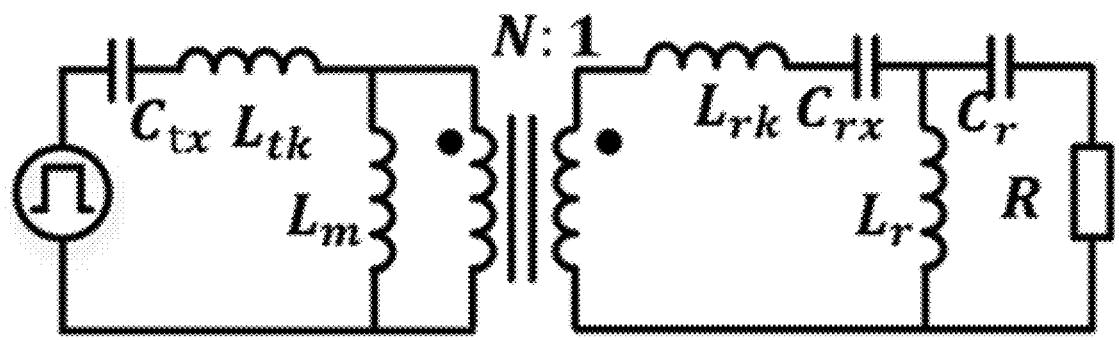
Figure 24:
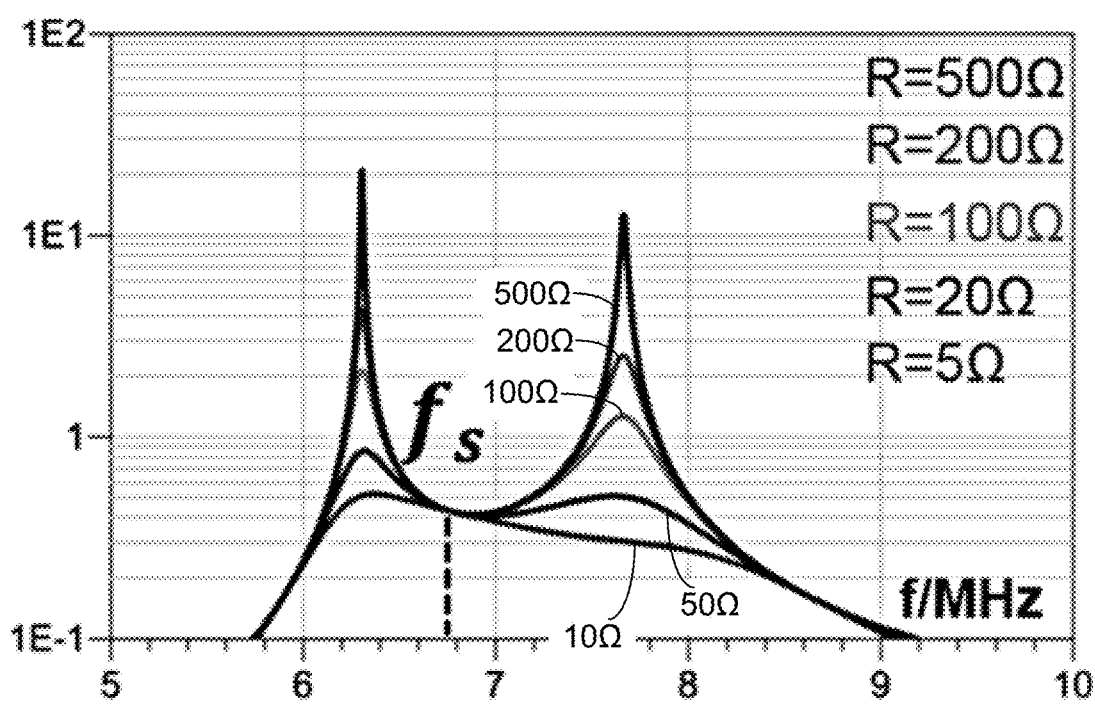
Figure 25:
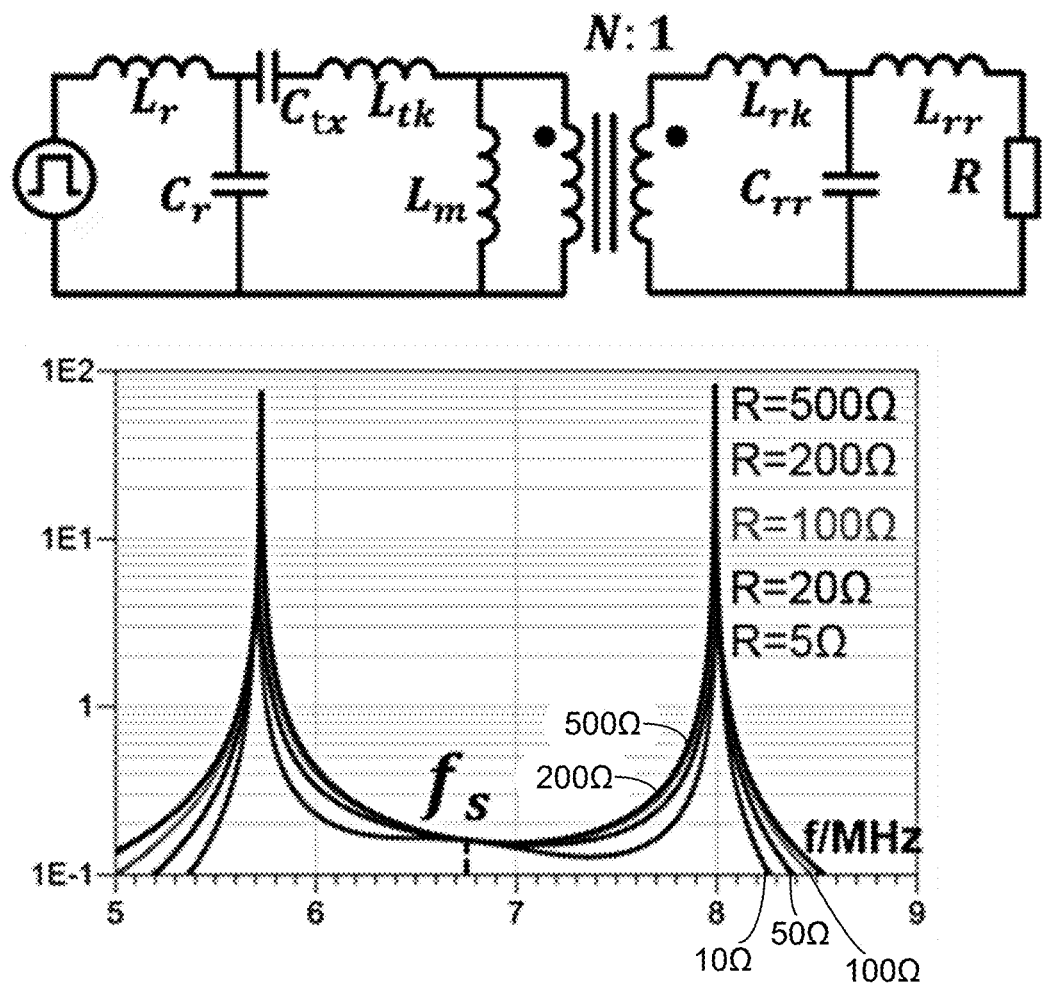
Figure 26:
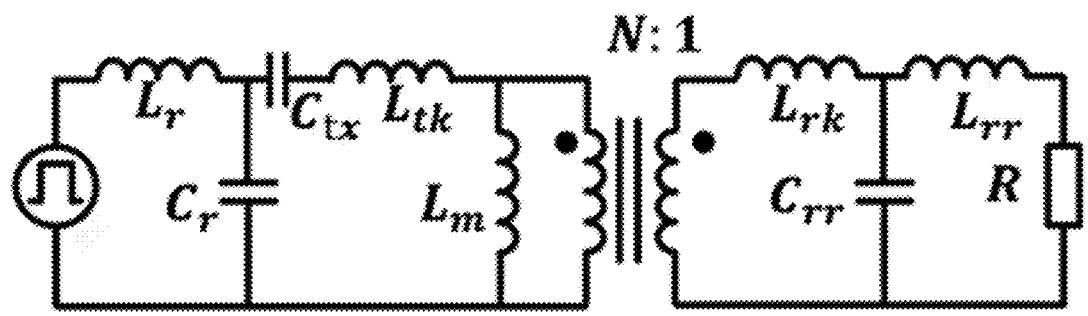
Figure 26:
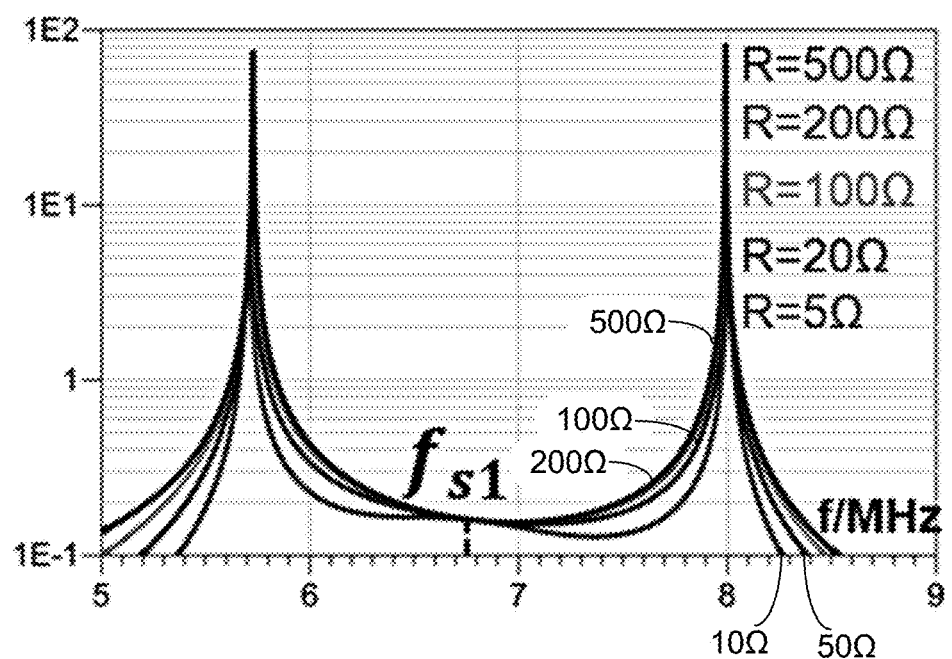

The other resonant converter topologies shown in FIGS. 23-26 have the same order as the CLCL-LC resonant converter topology in FIG. 22. FIG. 23 is a LCCL-LC resonant converter topology, FIG. 24 is a LC-LCCL resonant converter topology. Further, with the addition of more passive components, there are other resonant converter topologies with coupling independent resonance and ZVS operation. One such resonant converter topology having higher order than the CLCL-LC resonant converter topology is shown in FIG. 25. FIG. 26 is a LCCL-LCL resonant converter topology. In all these resonant converter topologies, a fixed SRF is created in the center of two PRFs in gain characteristics. With this type of gain characteristics, coupling independent operation region with ZVS operation can be obtained.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A planar omnidirectional wireless power transfer system, comprising:
    a plurality of resonant tank circuits electrically coupled to a power generator;
    a planar coil arrangement for omnidirectional wireless power transfer, the planar coil arrangement comprising a plurality of individual planar coils arranged for omnidirectional wireless power transfer to a device placed over the planar coil arrangement, each of the plurality of individual planar coils being electrically coupled to a corresponding one of the plurality of resonant tank circuits, the plurality of individual planar coils comprising:
        a first pair of planar graduated coils comprising two individual planar coils arranged in a side-by-side arrangement to provide field directivity in a first direction, each planar graduated coil comprising an outer winding extending around inner concentric windings, the inner concentric windings of each planar graduated coil increasingly offset away from another of the first pair of planar graduated coils;
        a second pair of planar graduated coils comprising two individual planar coils arranged in a side-by-side arrangement to provide field directivity in a second direction, each planar graduated coil comprising an outer winding extending around inner concentric windings, the inner concentric windings of each planar graduated coil increasingly offset away from another of the second pair of planar graduated coils; and
        a third planar coil arranged to provide field directivity in a third direction; and
    a controller configured to wirelessly transmit power through one or more of the plurality of individual planar coils by individually activating the corresponding one of the resonant tank circuits with different voltage or current to provide omnidirectional power transfer to the device.

2. The system according to claim 1, wherein:
    each of the two individual planar coils of the first pair of planar graduated coils is formed by a separate single conductive wire or trace and each of the two individual planar coils of the second pair of planar graduated coils is formed by a separate single conductive wire or trace.

3. The system according to claim 1, wherein:
    separation between the outer winding and an adjacent inner concentric winding of each of the first pair of planar graduated coils is larger on a side adjacent to the other planar graduated coil of the first pair of planar graduated coils than on a side opposite the other planar graduated coil; and
    separation between the outer winding and an adjacent inner concentric winding of each of the second pair of planar graduated coils is larger on a side adjacent to the other planar graduated coil of the second pair of planar graduated coils than on a side opposite the other planar graduated coil.

4. The system according to claim 1, wherein the third planar coil comprises a third circular coil, which is different in shape than at least one of the first pair of planar graduated coils or the second pair of planar graduated coils, to reduce parasitic capacitance in the planar coil arrangement.

5. The system according to claim 1, wherein:
    the first pair of planar graduated coils comprises a first pair of two individual rectangular coils in a side-by-side arrangement; and
    the second pair of planar graduated coils comprises a second pair of two individual rectangular coils in a side-by-side arrangement.

6. The system according to claim 5, wherein a longitudinal axis of the first pair of two individual rectangular coils is perpendicular to a longitudinal axis of the second pair of two individual rectangular coils.

7. The system according to claim 1, wherein:
    the first pair of planar graduated coils comprises a first pair of two individual oval coils in a side-by-side arrangement; and
    the second pair of planar graduated coils comprises a second pair of two individual oval coils in a side-by-side arrangement.

8. The system according to claim 1, wherein the plurality of individual planar coils are arranged to provide a multi-directional magnetic field distribution.

9. The system according to claim 1, wherein the controller is further configured to activate individual ones of the resonant tank circuits with different voltage or current over time to generate an omnidirectional field distribution over the planar coil arrangement.

10. The system according to claim 1, wherein the controller is further configured to sense a level of power transferred to the device by individual ones of the plurality of resonant tank circuits and identify a coefficient of power transfer between individual ones of the plurality of resonant tank circuits and the device.

11. The system according to claim 1, wherein the controller is further configured to modulate a supply of power provided to individual ones of the plurality of resonant tank circuits in at least one of amplitude or phase to generate an omnidirectional field distribution for increased power transfer to the device.

12. The system according to claim 1, wherein the plurality of resonant tank circuits comprise at least one resonant converter topology for coupling independent resonance and zero voltage switching (ZVS).

13. The system according to claim 1, further comprising: the device, the device comprising a receiver-side resonant tank circuit for near-field resonant inductive coupling with one or more of the plurality of resonant tank circuits and one or more of the plurality of individual planar coils.

14. The system according to claim 13, wherein at least one of the plurality of resonant tank circuits and the receiver-side resonant tank circuit comprises a resonant converter topology for coupling independent resonance and zero voltage switching (ZVS).

15. A planar omnidirectional wireless power transfer system, comprising:
a planar coil arrangement for omnidirectional wireless power transfer, the planar coil arrangement comprising a plurality of individual planar coils arranged for omnidirectional wireless power transfer to a device placed over the planar coil arrangement, the plurality of individual planar coils comprising:
a first pair of planar graduated coils comprising two individual planar coils arranged in a side-by-side arrangement to provide field directivity in a first direction, each planar graduated coil comprising an outer winding extending around inner concentric windings, the inner concentric windings of each planar graduated coil increasingly offset away from another of the first pair of planar graduated coils; and
a second pair of planar graduated coils comprising two individual planar coils arranged in a side-by-side arrangement to provide field directivity in a second direction, each planar graduated coil comprising an outer winding extending around inner concentric windings, the inner concentric windings of each planar graduated coil increasingly offset away from another of the second pair of planar graduated coils; and
a controller configured to activate individual ones of the plurality of individual planar coils with different voltage or current to wirelessly transmit omnidirectional power to the device.

16. The system according to claim 15, wherein a third coil is arranged to provide field directivity in a third direction;
the first direction is perpendicular to the second direction; and
the third direction is orthogonal to the first direction and the second direction.

17. The system according to claim 16, wherein the third coil comprises a third circular coil.

18. The system according to claim 16, wherein:
the first pair of planar graduated coils comprises a first pair of two individual rectangular coils in a side-by-side arrangement; and
the second pair of planar graduated coils comprises a second pair of two individual rectangular coils in a side-by-side arrangement.

19. The system according to claim 16, wherein:
the first pair of planar graduated coils comprises a first pair of two individual oval coils in a side-by-side arrangement; and
the second pair of planar graduated coils comprises a second pair of two individual oval coils in a side by-side arrange.

20. The system according to claim 15, wherein:
separation between the outer winding and an adjacent inner concentric winding of each of the first pair of planar graduated coils is larger on a side adjacent to the other planar graduated coil of the first pair of planar graduated coils than on a side opposite the other planar graduated coil; and
separation between the outer winding and an adjacent inner concentric winding of each of the second pair of planar graduated coils is larger on a side adjacent to the other planar graduated coil of the second pair of planar graduated coils than on a side opposite the other planar graduated coil.

* * * * *